April 16, 1957    H. L. PAULDING ET AL    2,788,886
TAPE CONTROL FOR LINE CASTING MACHINES
Filed June 2, 1954    8 Sheets-Sheet 1
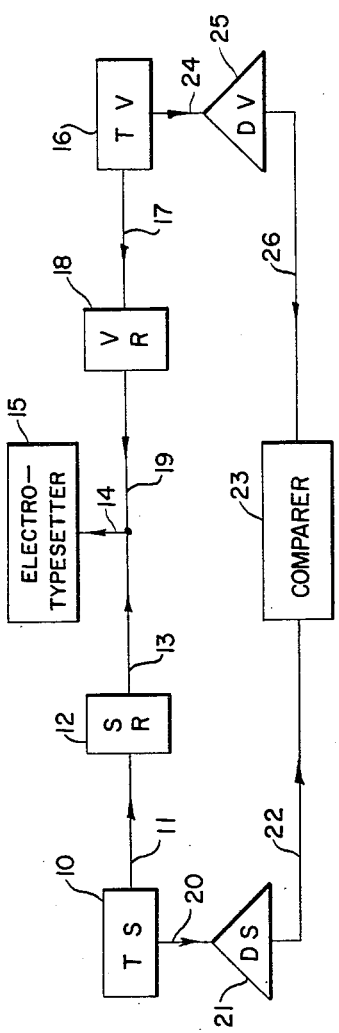
FIG. 1
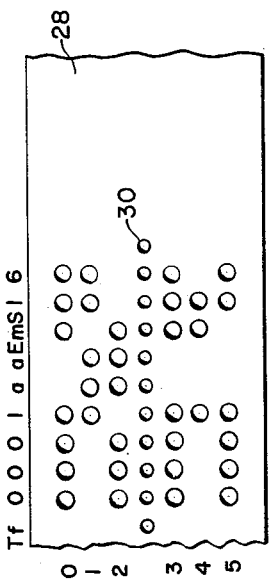
FIG. 3
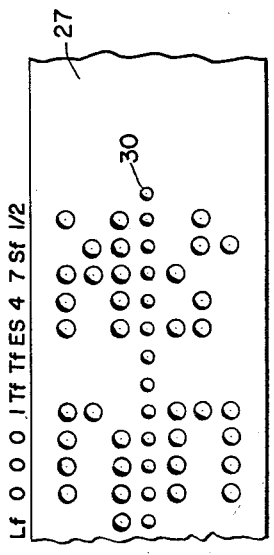
FIG. 2
FIG. 4
| STANDING TAPE | | | | | VARIABLE TAPE | | | | | |
|---|---|---|---|---|---|---|---|---|---|---|
| CODE | HIGH | LOW | STOCKS | DIV. | CODE | SALES | OPEN | HIGH | LOW | CLOSE | CHG |
| LfoooItfTf | 47 1/2 | 32 | ABBOTT LAB | 1.85 Cr | Tf0001aa | 16 | 43 | 43 1/8 | 42 7/8 | 42 7/8 | CrLf |
| Lf0002TfTf | 112 | 107 3/4 | ABBOTT L   Pf | Cr | Tf0002CrLf | | | | | | |
| Lf0003TfTf | 63 3/4 | 53 3/4 | ACF BRILL | Cr | Tf0003aa | 31 | 53 3/4 | 55 5/8 | 53 3/4 — 1/8CrLf | | |

April 16, 1957     H. L. PAULDING ET AL     2,788,886
TAPE CONTROL FOR LINE CASTING MACHINES
Filed June 2, 1954     8 Sheets-Sheet 2

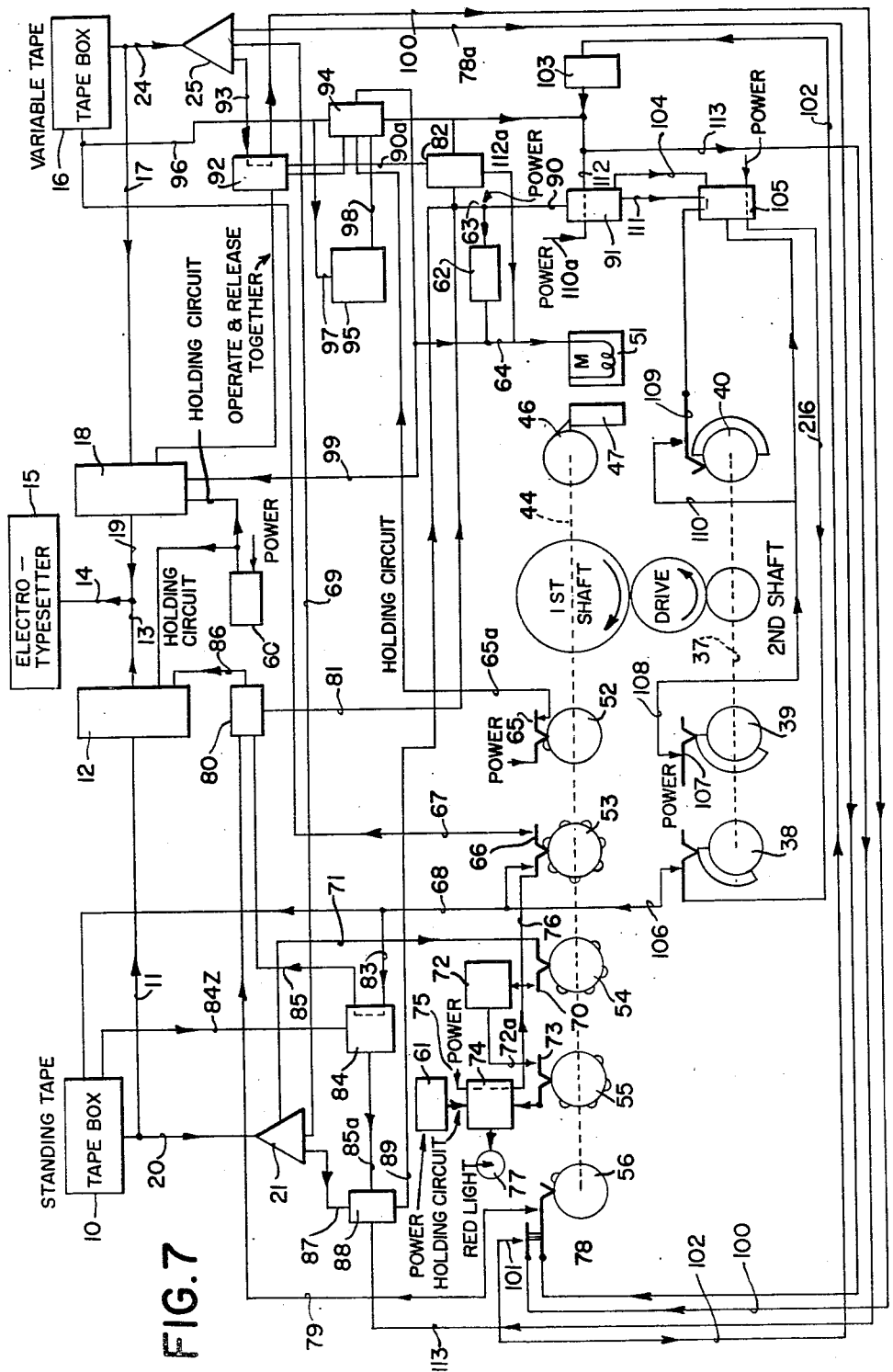

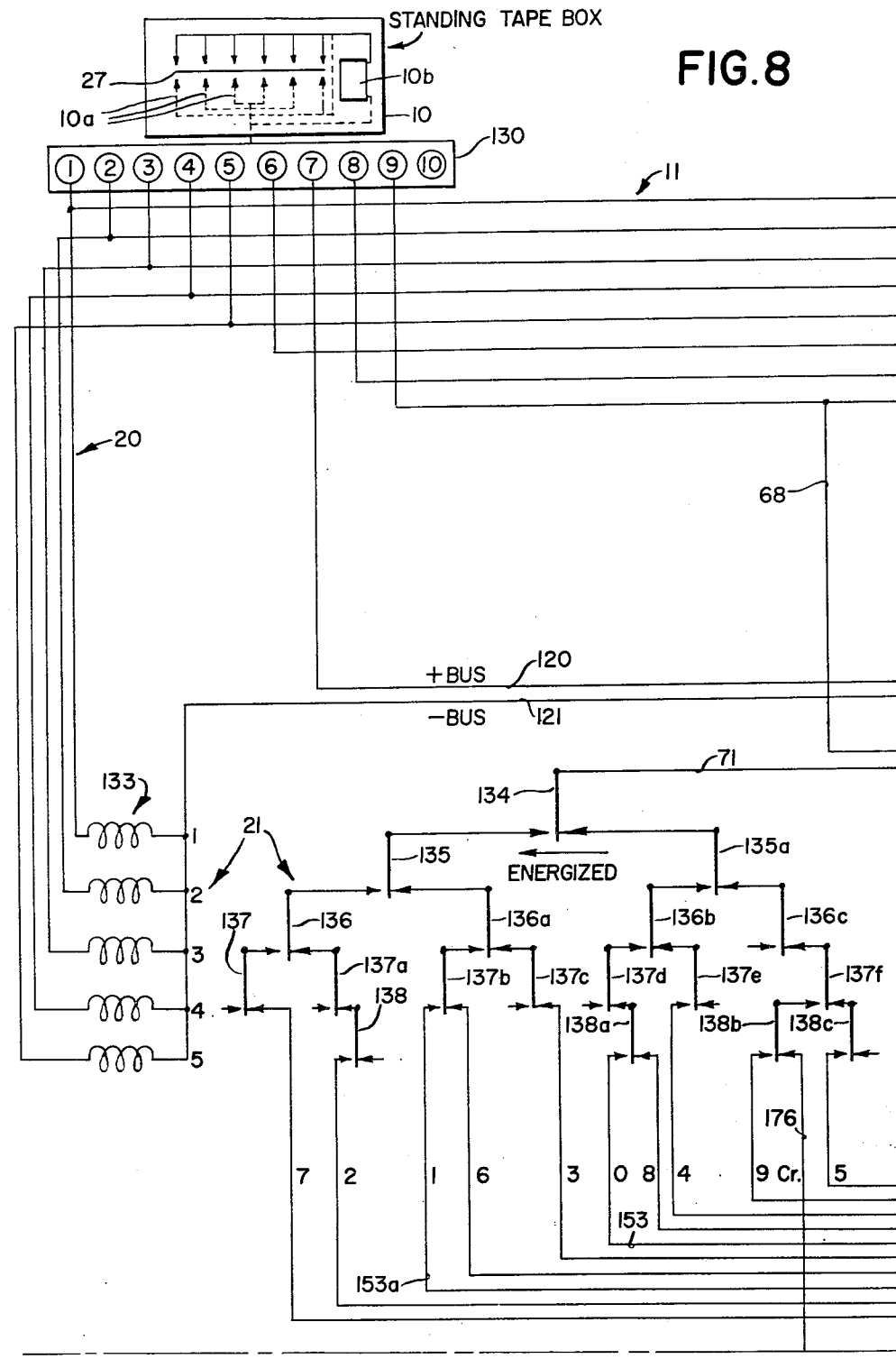

United States Patent Office 2,788,886
Patented Apr. 16, 1957

2,788,886

TAPE CONTROL FOR LINE CASTING MACHINES

Herbert L. Paulding, Port Washington, and Richard T. Yu, New York, N. Y., assignors to Dow Jones & Company, Inc., New York, N. Y., a corporation of Delaware Application June 2, 1954, Serial No. 433,982

30 Claims. (Cl. 199—18)

This invention relates to a method of and apparatus for controlling line casting machines of the type sold under the trademarks Linotype, Intertype, and the like. It involves the provision of a plurality of punched tapes for controlling the release and assembly of matrices and the operation of the various other devices in the machine. It involves also the coordination of the several tapes so that each will control the operation of the machine at the appropriate time to set up the desired information or data and to exercise the other necessary controls.

The method and means of the present invention for controlling the operation of a line casting machine from each punched tape, as it is placed in control of the machine, may be the same as disclosed in the application of Joseph J. Ackell, Serial No. 287,220, filed May 10, 1952, now Patent No. 2,704,595.

An important object of the invention is to facilitate and expedite the setting up on a line casting machine of information or matter a part of which is available in advance of other parts. This is of special utility in setting up the usual data published in various newspapers and similar publications with respect to stock market transactions. It is highly desirable to have information of this character available for publication as soon as possible after the stock market closes each day. Many evening newspapers carry information concerning each stock that has been traded in during the course of the day. Such information usually includes matter which is based upon the previous history of each particular stock through the preceding day of stock market transactions, and then also includes information concerning the activities in connection with each stock during the particular day on which the publication is made. Considerable time is required to compile and set up this information with an assurance of accuracy, and it has heretofore been customary to employ a large number of persons and machines to expedite the setting up of such information immediately following the close of the various stock exchanges each day in order to enable the publication of this information within a relatively short period of time after the exchanges close.

In accordance with the present invention the publication of the desired information is greatly facilitated so that it may be published more speedily and through the use of less equipment and personnel. Toward this end the invention contemplates the setting up during the course of the day certain of the information concerning each stock which forms a part of its history that is available at the close of the preceding day. This information may include, for example, the name of the stock, its high and low values at the close of the preceding day, and its dividend history for the year. Such information is conveniently set up on a punched tape at any time during the day so as to be available at the close of the stock markets for that day. The tape so punched is used to control a line casting machine in accordance with the disclosure of said Ackell application. For convenience the punched tape carrying the indicated information will be designated herein a standing tape.

At the close of the various stock markets each day information is set up, in accordance with the invention, on a second tape with respect to the transactions which have taken place in each stock during that day. The information so set up on the second tape, which for convenience will be referred to herein as the variable tape, includes the volume of sales, the opening price, the high price, the low price, the closing price, and the change over the preceding day identified with each stock traded in.

Further in accordance with the invention, provision is made for alternately controlling the line casting machine from the standing tape and the variable tape so that data relating to each type of stock traded in during the day may be set up in proper order on the line casting machine. A portion of each line to be cast will be determined by the standing tape and another portion by the variable tape. It will be appreciated that certain stocks will not be traded in during a particular day, and provision must therefore be made for eliminating the setting up on the line casting machine of any information concerning such inactive stocks. Yet the standing tape must carry the preceding history with respect to all stocks carried on a particular stock exchange so that in the event of any sale of a particular stock during the day the previous history will be available on the tape for appropriate control of the line casting machine.

An important feature of the invention is the provision of a code system for identifying each stock carried on a particular exchange. The several stocks so carried may, for example, be numbered from 1 to whatever the total number may be. It has been found that a four figure number is adequate to take care of all the stocks traded in on a particular exchange. Accordingly the code numbers are represented by four figures from 0001 to 9999. Provision is made in accordance with the invention for comparing the code numbers on the standing and variable tapes to insure proper correlation between the information concerning a particular stock on one tape with the information concerning the same stock on the other tape. Should the two tapes be found to be out of step or out of conformity for some reason, at the time the code designations for a particular stock are being analyzed on the two tapes and compared, the tape feeding operations and the entire system will be automatically stopped and a signal such as a red light will be flashed to draw attention to this improper coordination of the two tapes.

Another important feature of the invention is the provision of means for preventing the control of the line casting machine by the standing tape to set up the information represented by the perforations in that tape, which is, for example, identified with a particular stock that has not been traded in during the day. This, in the particular example indicated, is accomplished by the inclusion, in the code on the variable tape, of perforations which designate whether or not the particular stock having a particular code number has been traded in. If it has been traded in, the code on the variable tape will include perforations constituting what we designate herein an "accept signal." Similarly, the code on the variable tape identified with another stock which has not been traded in will include perforations constituting a "reject signal." Such a reject signal will prevent the transmission from the standing tape of the information carried by it relative to the particular stock in question. The accept signal, on the other hand, will cause the information relating to the stock whose code on the variable tape includes such signal to be transmitted from the standing tape to the line casting machine.

A further feature of the invention is the provision of means for speeding up the advance of the standing tape whenever the reject signal in relation to a particular stock is indicated by the code on the variable tape relating to that stock. Thus the tape may be advanced at a speed substantially greater than its normal speed, since the perforations in the standing tape relating to the stock in question will not be utilized in controlling the line casting machine. The standing tape is advanced rapidly and brought to the initial code designation of the next stock in the list as quickly as possible. The same procedure, as explained above, is followed in comparing the code designations on the two tapes to determine whether they coincide, and to determine whether the information on the standing tape is to be "accepted" or "rejected."

In the event that the code on the variable tape for a particular stock concludes with an accept signal, the control of the line casting machine is swung over to the standing tape which is then advanced step by step at the normal speed, predetermined by the line casting machine, to set up in the latter the information which it carries, and upon the completion of this the control is swung over to the variable tape which then transmits its information relating to the same stock to the line casting machine to complete the line.

In the preparation of the standing and variable tapes a key operated mechanism is employed for controlling the necessary punches. Simultaneously, this key operated mechanism controls a telegraphic printer of the type disclosed in the patent to Ackell et al., No. 2,531,868, granted November 28, 1950. The control of such a telegraphic printer requires the inclusion in the tapes of perforations representing certain signals such as carriage return (Cr) and line feed (Lf). The carriage return signal has no effect upon the line casting machine even though it appears in that portion of the information which is normally transmitted to that machine. On the other hand, the line feed signal which causes a line feeding operation in the telegraphic printer serves to bring about the lifting of the elevator in the line casting machine. This occurs, however, only when the tape bearing that signal is in control of the line casting machine.

Other objects, features and advantages of the invention will appear from a detailed description of an illustrative embodiment of the same which will now be given in conjunction with the accompanying drawings, in which:

Fig. 1 is a block diagram showing the interrelation between the various principal elements of the system involved in the present invention;

Fig. 2 is a view showing a section of the standing tape used for the control of the system;

Fig. 3 is a similar view of a section of the variable tape used for the control of the system;

Fig. 4 is a view of a record produced on a telegraphic printer simultaneously with the punching of the standing and variable tapes;

Fig. 7 is a block diagram showing, somewhat more comprehensively than Fig. 1, the interrelation between the major elements of the system;

Figs. 8, 9, 10 and 11 are circuit diagrams which, taken together, illustrate the interconnection between the various parts of the system; and Fig. 12 is a view showing the significance of the various perforations which may appear in the several tapes.

Figure 9:
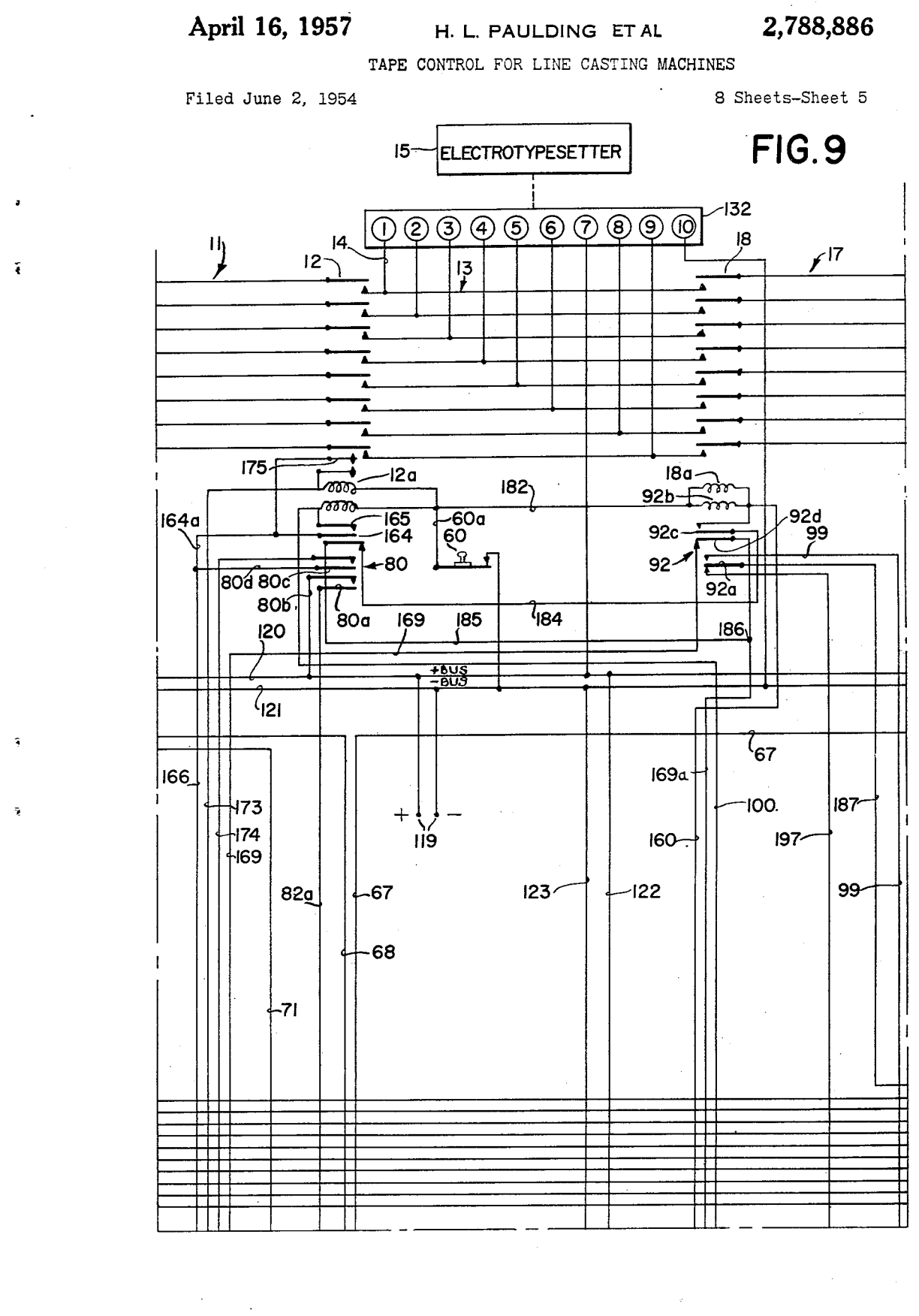
Figure 10:
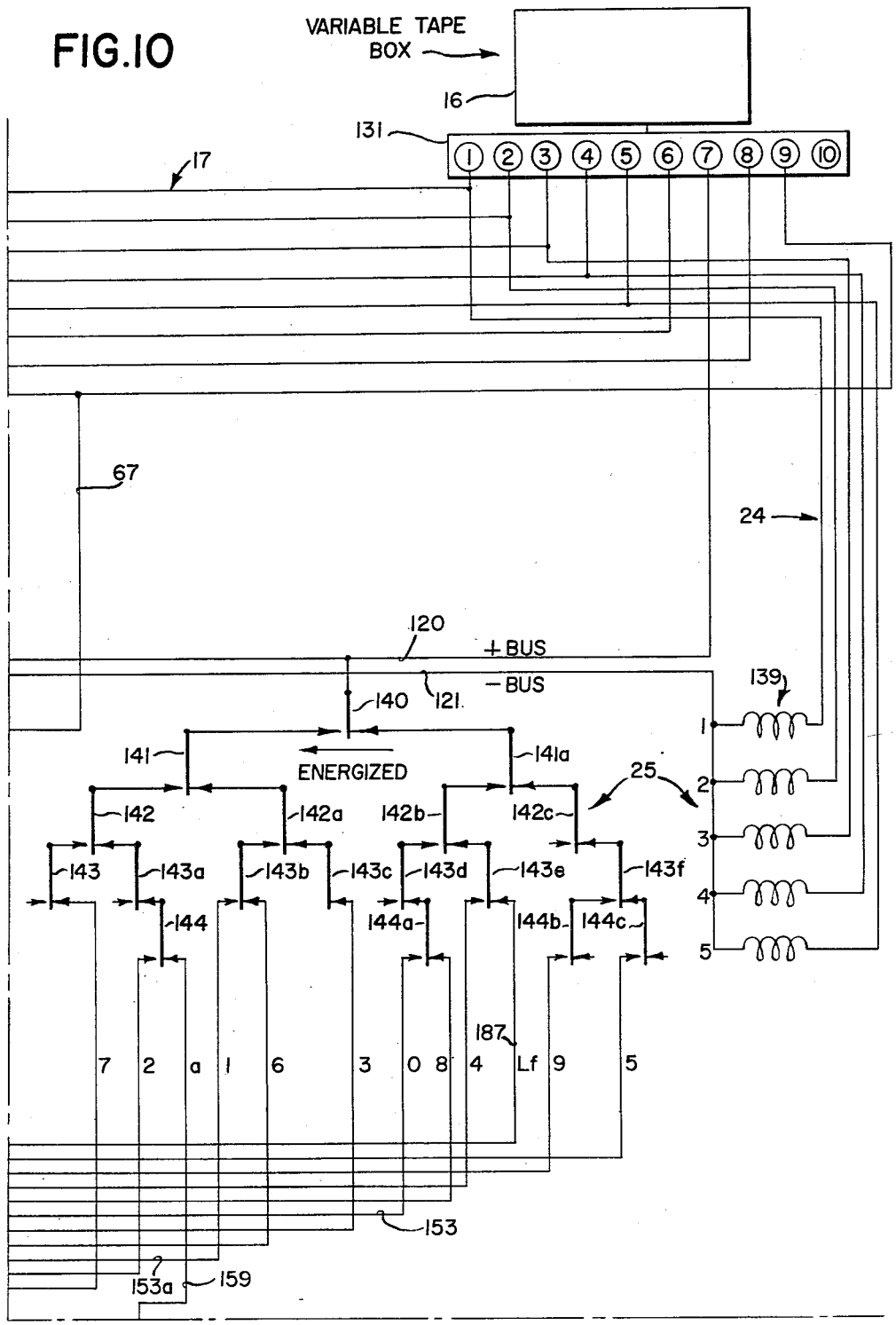

The wiring diagram for the complete system may be seen by placing Figs. 8, 9 and 10 in sidewise juxtaposition and placing Fig. 11 centrally below Fig. 9 and portions of Figs. 8 and 10. This will be explained more fully after the general arrangement of the several parts of the system has been explained in relation to the eariler views.

Turning now to Fig. 1, the system is provided with a tape box 10 with the usual tape feeding and tape analyzing devices identified with the standing tape. This box is connected by a cable 11 and nine wires with a relay system 12 for the standing tape, which is in turn connected by a cable 13 and a further cable 14 with an electrotypesetter 15. A second tape box 16 similar to tape box 10 is provided for advancing and analyzing the variable tape. This tape box is connected by a nine wire cable 17 with a relay system 18 identified with the variable tape. Relay system 18 is connected by a cable 19 with the cable 14 and in turn with the electrotypesetter.

Tape box 10 is connected by another cable 20, having five wires, with a system of relays 21 forming part of a decoding means for the code designations on the standing tape. This decoding relay system is connected by a cable 22 with a comparing and controlling unit 23. Similarly the tape box 16 is connected by a cable 24 with a decoding relay system 25 adapted to decode the perforations identified with the code designations on the variable tape. Decoder 25 is, in turn, connected by a cable 26 with the comparing unit 23. As previously explained, the arrangement is such that if the circuits closed through the action of the decoder 21 do not correspond with the circuits closed through the portion of the decoder 25, as these are compared by the unit 23, the entire system will be automatically thrown out of operation and a signal, such as a red light, will be flashed to advise the attendant that readjustment of the system should be effected.

Assuming that the code designations analyzed by the decoders 21 and 25 correspond correctly, and assuming further that decoder 25 transmits an "accept signal," suitable relays in the system will serve to throw the control from the standing tape box 10 over to the relay system 12 so that the data represented by the holes punched in the standing tape will be transmitted to the electrotypesetter. When the data identified with the particular stock designated by the decoded code number has been transmitted to the electrotypesetter, the final signal transmitted from the tape box 10 will swing the control of the electrotypesetter over to the tape box 16. The variable data, represented by the perforations in the tape passing through the tape box 16, will then be transmitted to the electrotypesetter and appropriately set up in the line to be cast. The final signal transmitted from the tape box 16 will serve to bring about the operation of the elevator on the line casting machine and will also serve to control the various relay systems to bring about a repetition of the decoding and comparing of the code designations on the standing and variable tapes.

It should be explained that the complete system is provided with a plurality of holding circuits which serve to retain various relays in their operated positions, until they are released by appropriate releasing signals transmitted from one part of the system to another. Also it should be understood that appropriate delays are incorporated in certain of the relay operating circuits of the system to provide the appropriate time lapse needed for certain of the operations.

In Figs. 2, 3 and 4 there are shown, respectively, a portion 27 of the standing tape, a portion 28 of the variable tape, and a portion 29 of the record strip bearing the matter printed by the telegraphic printer simultaneously with the punching of the two tapes. The record strip 29 is produced in two parts: that identified with the standing tape being printed during the morning, for example, as the standing tape is being punched, and that identified with the variable tape being printed shortly after the close of the market on a particular day as the variable tape is being punched. If desired, the same record strip may be passed through the telegraphic printer twice to receive the full information, or two separate record strips may be formed and placed side by side to bring about the combined record indicated in Fig. 4. The two record strips may be pasted or otherwise secured to a supporting strip or sheet for convenience in checking the information set up on the line casting machine.

Each of the punched tapes has a series of small holes 30 extending longitudinally along the center line thereof for tape feeding purposes. On each side of the tape feeding openings 30 there may be as many as three perforations alined therewith to identify the character to be printed or function to be controlled as a particular line across the tape is brought into the path of the analyzer or feeler pins of the related tape box. The perforations shown in Figs. 2 and 3 correspond with the data recorded for the first stock indicated on the printed record 29. It will be noted that each tape has seven successive positions or lines of perforations identified with the code. However, only the second, third, fourth and fifth lines or positions are actually involved in the code number. The first line or position on the standing tape corresponds with a line feed signal (Lf) to the telegraphic printer employed in the course of punching the tape, to advance the record strip one line. In analyzing the standing tape this line of perforations, i. e. a single perforation in position 2 across the tape exerts no control. It should be explained that the positions of the perforations across the tape are considered herein as numbered 0, 1, 2, 3, 4, and 5 from the top to bottom of the tape in Fig. 2. This will be in a direction from top to bottom of the tape as it is moving horizontally across the plane in which the feeler pins are disposed. In the first line across the variable tape there are no perforations and there is simply an idle feeding of the tape. The next four positions on both tapes are identified with the code number of the particular stock with which the portions of the two tapes illustrated are identified. The last two of the seven code positions on the standing tape are simply blank, except for the tape feed apertures, so that the standing tape box 10 exerts no control as these two positions are fed past the analyzer pins. However, the corresponding positions, i. e. sixth and seventh lines of perforations on the variable tape 28 are identified with an "accept signal" which prepares the system for the transfer of control from the two tape boxes to the electrotypesetter for controlling the setting up of the information concerning the stock in question on a line to be cast by the typesetter. The first signal transmitted to the electrotypesetter from the standing tape is an En space signal since the high value of the stock involves only two whole digits. This signal causes release of an En space matrix for assembly in a line on the line casting machine. The next line of perforations in the standing tape transmits a signal for the release of the matrix 4 in the line casting machine, while the next line of perforations brings about the release of a matrix 7. Since a fraction is involved in the high price of the stock it is necessary to transmit to the line casting machine a shift signal represented by the perforations designated Sf in Fig. 2. This is followed by a line of perforations calling for the release of a matrix carrying the fraction ½. As will be understood the standing tape is advanced step by step until all of the data concerned with the particular stock in question is transmitted to the electrotypesetter, and when this has been completed a carriage return signal (Cr) is represented by the perforations in the tape. This exerts no control over the line caster but is required for the control of the telegraphic printer, which as explained is in operation as the tape is being punched. Upon the analyzing of the carriage return perforation in the standing tape, i. e. a single perforation in position 4, the relay circuits switch the control over to the variable tape and bring about the successive advance of this until the lines of perforations identified with the data relating to the number 0001 stock is set up on the line casting machine through the release of appropriate matrices.

Upon completion of the setting up of this data a carriage return signal is called for by the perforations in the variable tape and this serves no purpose in the control of the line caster but is formed as a necessary incident to the proper control of the telegraphic printer. The final line of perforations in the variable tape identified with the stock in question calls for a line feed signal which is identified with that function in the telegraphic printer and is also transmitted to the line casting machine, upon the analyzing of the tape, to bring about the operation of the elevator.

Figure 12:
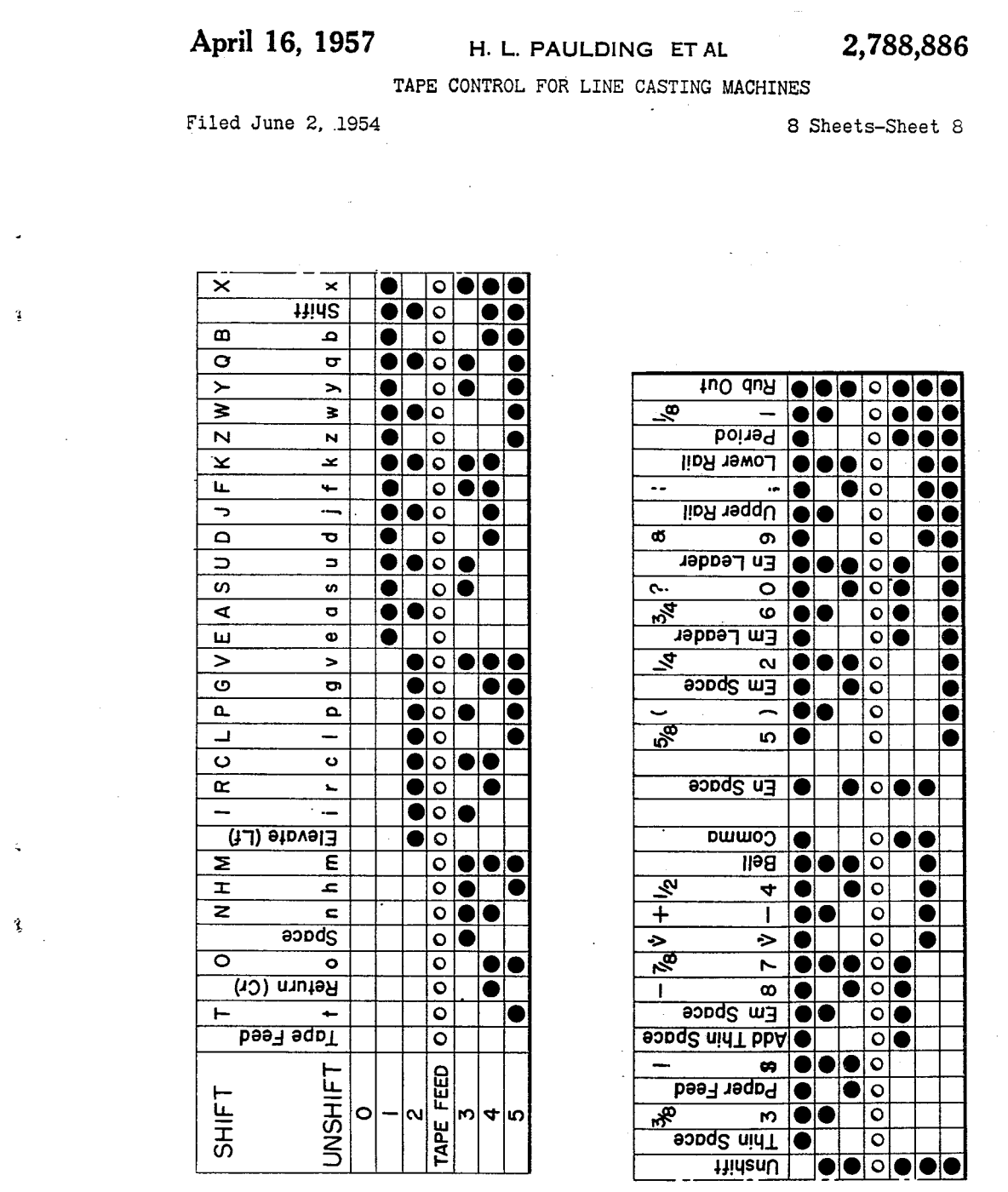

By way of explanation of certain notations appearing in Figs. 2 and 3, it is explained that the notation EmS means Em space and the line of perforations so designated will coincide with a spacing movement of the carriage of the telegraphic printer and will bring about release of an Em space matrix in the electrotypesetter. The designation EnS stands for En space, and the perforations so identified bring about a corresponding result. The designation S.b. stands for space band, and the presence of the perforations so identified bring about the production of an appropriate spacing of the matter to be printed. Sf identifies perforations which bring about a shift from lower case to upper case and the like, while the designation Usf identifies perforations which provide an unshift signal which restores the controls to the production of lower case characters and the like. It should be understood in this connection that the shift signal brings about the printing of fractions instead of whole numbers when certain number keys are depressed. The designation ml stands for Em leader. Fig. 12 shows the arrangement of perforations for each of the characters and signals involved in the control of the line casting machine.

Figure 5:
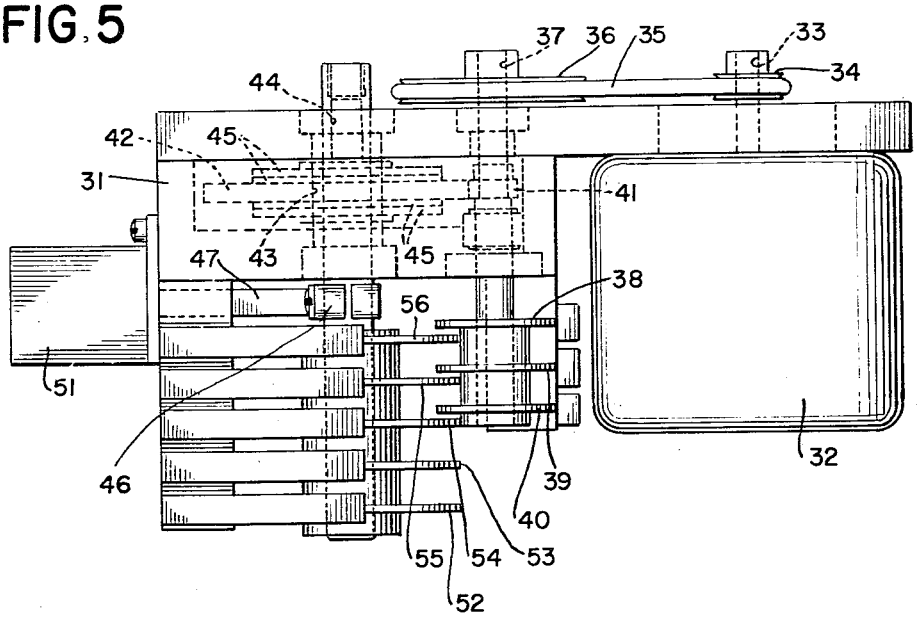
Fig. 5 is a plan view of a device employed in the decoding or comparing of the code designations on the two tapes.
Figure 6:
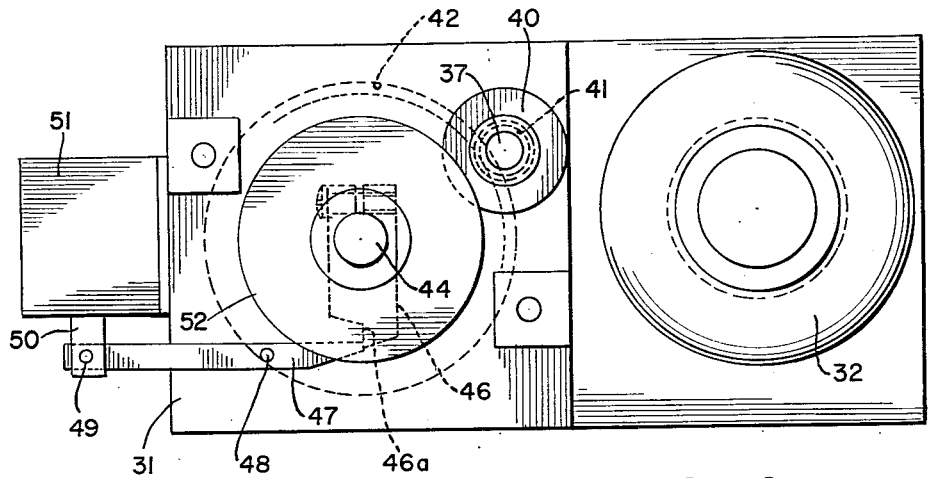
Fig. 6 is an elevational view of the device shown in Fig. 5.
Figure 6A:
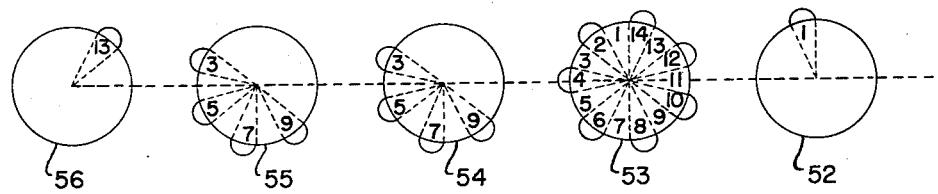
Fig. 6A is a diagrammatic view showing the relative location of certain bumps on a number of cam elements embodied in the device of Fig. 5, a complete cycle of operation being divided into 14 different zones.

In order to facilitate an understanding of the more complicated circuits actually involved in the system, it is believed desirable at this point to describe briefly a commutator unit embodied in the devices for comparing the code designations on the standing and variable tapes. This commutator unit, as shown in Figs. 5 and 6, comprises a frame 31 which carries a motor 32. The motor has a driven shaft 33 which carries a pulley 34 connected by a belt 35 with a pulley 36 secured to a shaft 37 journalled in the frame. Shaft 37 carries three cams or commutator elements 38, 39 and 40 having the general configuration indicated in Fig. 7 and arranged to cooperate with certain contact elements to complete various circuits at the appropriate times. Secured to the shaft 37, which is constantly driven by the motor 32, is a pinion 41 which meshes with a gear 42 mounted on a sleeve 43 which is keyed to or otherwise secured for rotation with a shaft 44. Gear 42 is capable of rotation about the sleeve 43 but serves to rotate the latter whenever turning of the shaft 44 is not prevented in the manner to be explained. For this purpose friction disks 45 at each side of the gear 42 serve to transmit power from the gear to the sleeve. Two of these disks are secured to the gear 42 and two are secured to the sleeve. Turning of the shaft 44 is normally prevented by the engagement of a shoulder 46a, on an arm 46 secured to the shaft, with the end of a detent 47. The latter is pivoted at 48 on the frame and is pivotally connected at 49 with the armature 50 of a solenoid 51. This solenoid is energized at appropriate times in the manner to be explained so as to bring about rocking of the detent 47 to release the arm 46 and the shaft 44 for rotation through one revolution with the gear 42. It will be understood that solenoid 51 is operated only momentarily at the appropriate times so that the detent 47 is returned to its active position before the shaft 44 completes a revolution. Secured to the shaft 44 and rotated therewith are commutator or cam elements 52, 53, 54, 55 and 56. These cam elements cooperate with certain switch arms to be hereinafter described for the opening of certain circuits and the closing of others upon each revolution of the shaft 44.

Figure 11:
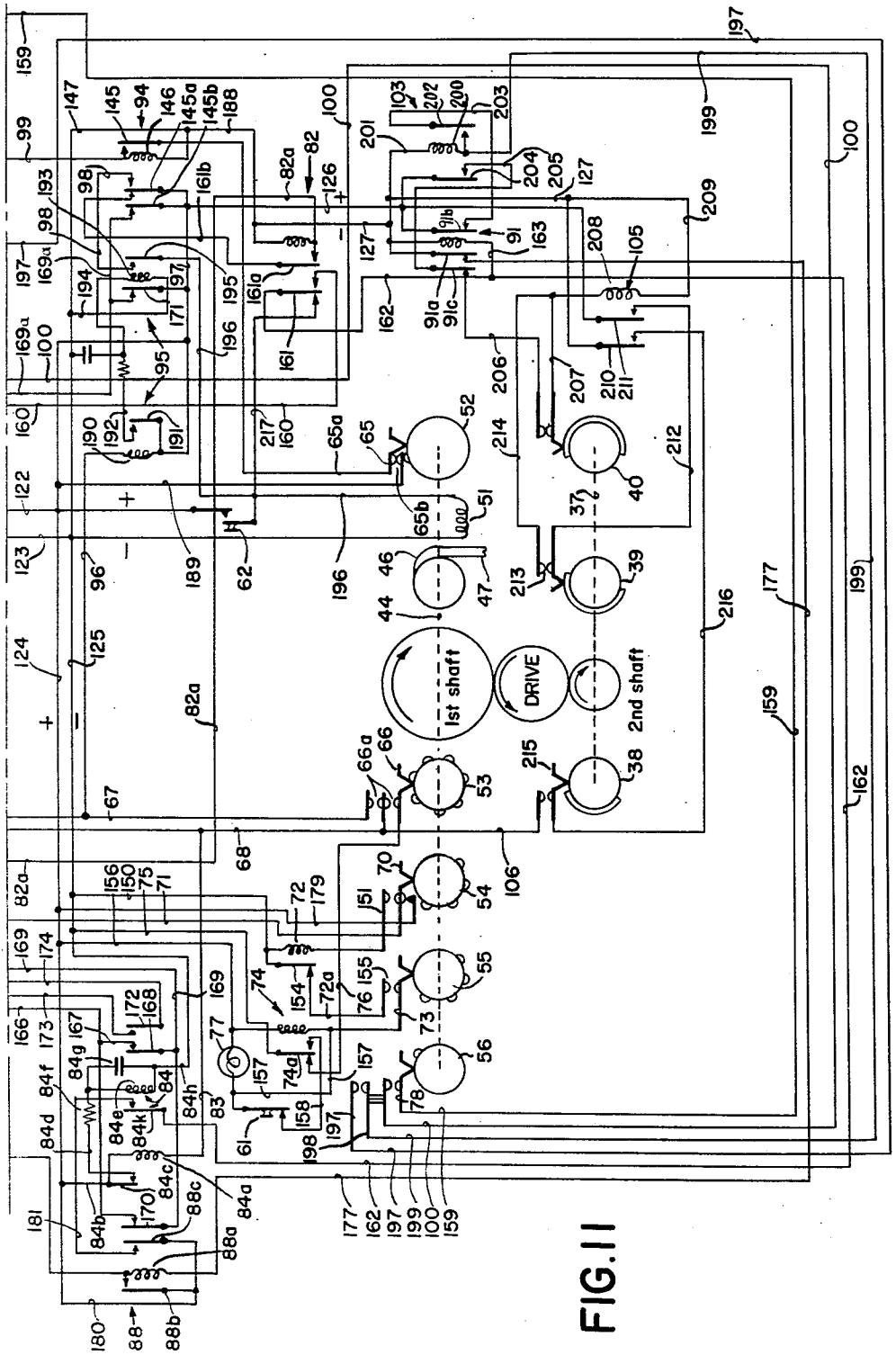

As best shown in Figs. 7 and 11, the cam 52 is provided with a single bump which becomes effective at the beginning of rotation of the shaft 44 to operate its related switch momentarily. The cam 53 is provided with seven bumps which operate successively on a switch member to bring about stepping of the tapes in the two tape boxes seven times during a revolution of the shaft 44. During the intervals between each stepping of the tape, the analyzing pins or fingers in the tape boxes will be operated to control the necessary relays for comparing the code numbers on the two tapes and for performing other functions. The cams 54 and 55 each have four bumps which operate related switches to close certain circuits during the comparing of the four digits of the code number appearing in each of the tapes. The projections of the cam 54 are of somewhat greater circumferential length than those of the cam 55 so as to retain the related switch in closed position over a somewhat longer period of time. Cam 54 becomes active in advance of cam 55 and remains active for a short interval after the cam 55 has released its switch arm. The cam 56 has a single bump which becomes effective toward the end of the rotation of the shaft 44 to operate a switch which sets into operation certain devices for either accepting or rejecting the data represented by the subsequent perforations in the standing tape.

The driving connections for the shafts 37 and 44 are such that shaft 37 is rotated at a considerably higher speed than shaft 44. Its angular speed may suitably be six or more times that of shaft 44. This is to enable rapid stepping of the standing tape whenever the data following the code identification is not to be transmitted to the electrotypesetter. As has been explained, this occurs whenever the particular stock with respect to which information is about to be printed has not been traded in during the day. The appearance of the Lf signal in the seventh position of the code designation on the variable tape serves to reject the related data on the standing tape and swings the control over the movements of the latter to the cams 38, 39 and 40 rather than to the electrotypesetter system, as will be explained.

Referring now to Fig. 7, there is disclosed in greater detail, though still schematically, the interconnection between the various devices indicated diagrammatically in Fig. 1. Those devices and certain of the electrical connections between them are identified by the same reference numerals in Fig. 7 as are used in Fig. 1.

When the apparatus is to be put into operation, the operator should carefully compare the standing and variable tapes to make certain that their code designations coincide. The two tapes should then be positioned in the tape boxes with their corresponding lines of perforations alined with the analyzer or feeler pins of the boxes. When this has been done the operator operates a switch 60 momentarily, by the depression of a button or the like, and this serves to break certain circuits from a suitable power source to certain of the relays in the system, thus releasing the holding circuits for these relays and permitting the latter to be restored to a starting position. A switch 61 is similarly operated to release other holding circuits, with the result that the system as a whole is reset to a predetermined condition from whatever condition it may have assumed when last thrown out of operation. A switch 62 may now be operated to bring about delivery of power from a source 63 through a line 64 to the magnet 51. This, as has been explained, will cause operation of the detent 47 to release the shaft 44 for a single revolution. At the commencement of this revolution the bump on the cam or commutator 52 engages a switch arm 65 to break the circuit from the connected power source to another holding circuit 65a, which has been holding a relay 94 in operated position if the said relay 94 was energized during the last operating cycle of the apparatus before it was last thrown out of operation. Cam 53 will next be effective to lift a switch arm 66 for the first of seven successive operations of it during the rotation of the shaft. Upon each lifting of this switch arm, it is brought into engagement with contacts which are connected through lines 67 and 68 with the two tape boxes. Through the circuits so closed the tapes in the two boxes will be advanced to bring the next line of perforations in each tape into the path of the analyzer pins. After each of the first four stepping movements are thus imparted to the tapes, the cams 54 and 55 will operate related switch arms. These arms will be operated four successive times during the rotation of the shaft 44. Cam 54 acts upon switch arm 70 to lift this and complete a circuit from the decoding unit 21 through line 71 to relay unit 72. Depending upon whether the code designations in the two tapes do or do not coincide, various other circuits will be completed. If they coincide, the relay 72 will prevent the closing of certain circuits. But if they do not coincide a circuit will then be completed from one side of the power source through the relay 72 and then through a line 72a to switch arm 73, which will be lifted by one of the bumps on the cam 55 while the switch arm 70 is still lifted. Switch arm 73 will then complete a circuit to a relay 74 and then to the opposite side of the power source. Operation of relay 74 will break a circuit from one side of a power source 75 through a line 76 to the switch arm 66. This will prevent further stepping of the tapes. The bumps on the cams 54 and 55 are so positioned that they are effective during the second, third, fourth, and fifth positions of the code perforations in the two tapes. Through the successive operation of the several switch arms in the manner explained the code perforations in the two tapes are compared digit by digit. If the perforations in the two tapes coincide, the relay 72 will be operated and the circuit to the tape stepping magnets through the switch arm 66 will not be broken. However, if at any time the perforations in the two tapes which are being simultaneously analyzed do not coincide in the course of this comparison the circuit through the relay 72 will break the circuit through the relay 74 to the switch arm 66 so that upon the subsequent lifting of this switch arm no current will be delivered through the lines 67 and 68 to the two tape boxes. Accordingly the tapes in these boxes will not be advanced. At the same time a circuit will be completed through red light 77 which will call to the attention of the operator the fact that the code numbers in the two tapes do not coincide. The operator then inspects the two tapes to determine the cause of the error, and if this happens to be merely an improper feeding of one of the tapes the two tapes may be repositioned in the tape boxes with the perforations identifying the first of the seven code designations alined with the analyzer pins, and the system may then be placed in operation again by first operating the two switches 60 and 61 and then the starting switch 62.

After the sixth step of feed has been imparted to the two tapes by the bumps on the cam 53, and just before the seventh bump causes the seventh step of advance, the bump on the cam 56 operates a switch arm 78 to close a circuit through line 79 to a relay 80 from which the circuit extends through a line 81 to a relay 82. This occurs only, however, if the seventh line of perforations in the variable tape signifies an "accept" signal which is transmitted from the decoder 25 through a line 78a. Suitable provisions are made in this circuit for holding it. The seventh bump on the cam 53 then brings about the seventh step of advance of the two tapes, and at the same time causes a circuit to be completed from line 68 through a line 83, a relay unit 84, and through connections indicated by the line 85 to the relay 80, which has previously been operated and held in the manner explained. At this time a circuit is completed, as indicated by the line 86, to the relay system 12. This serves to swing the control from the tape box 10, through the cable 11, to the relay unit 12 so that the information punched in the standing tape will be transmitted to the electrotypesetter 15. It will be understood that at this time the control over the feeding of the standing tape will be exercised by the electrotypesetter through the relay 12. The analyzer pins of the tape box 10 will still bring about shifting of the relays in the decoder 21, but the comparing circuits from the latter will be broken at this time. In connection with the foregoing, it should be stated that the relay group 84 has incorporated in it a time delay which provides the desired timing for the proper operation of the system.

As the information on the standing tape relating to the stock item which has been "accepted" in the manner explained, by the final code signal determined by the variable tape, is transmitted to the electrotypesetter the carriage return signal is reached and this constitutes a signal that the full information concerning the particular stock has been completed. The carriage return signal has no effect upon the electrotypesetter, but it is received by the decoder 21 which then serves to perform the necessary switching operation in conjunction with the various relay circuits. This switching operation is such as to swing the control of the electrotypesetter over to the tape in the variable tape box 16. The circuits which accomplish this are rather complicated but are represented in Fig. 7 by a line 87 extending from the decoder 21 to a relay 88 and by lines 89 and 90 to a relay 91, and line 90a to relays 92 and 18. The switchover is accomplished, after the foregoing circuit is substantially completed and certain relays are held, when a final feed pulse is given to the standing tape. This pulse serves to operate the relay 84 through connections represented by line 84z, and the relay 84, in conjunction with the previously conditioned relays 88 and 82, serves to close circuits to operate relays 91, 92 and 18. Operation of relay 91 serves to restore relay 88 back to its normal condition. Relays 18 and 92 release the relay unit 12 and also relay 80, by breaking the holding circuits indicated. Thus the standing tape control is released entirely, and the variable tape is put into operation under the control of the electrotypesetter and the circuits of the relay unit 18. The information carried by the variable tape is then transmitted to the electrotypesetter through the relay unit 18 until the final Lf (line feed) signal in the variable tape is reached. This closes a circuit which brings about the elevation operation on the electrotypesetter and causes the line to be cast in conformity with the matrices which have been released in accordance with the information on the two tapes.

Throughout the control of the electrotypesetter from the variable tape by means of the relay unit 18 the analyzer pins of the tape box 16 serve to adjust the relays in the decoder 25. Because of the condition of the circuits identified with this decoder, however, nothing occurs until the Lf signal is reached and this when reached brings about the release of the variable tape from its control over the line casting machine. The Lf signal in the variable tape, acting through the decoder 25, and the operated relay 92, causes operation of the relay 94 to bring about the release of relays 82 and 91. One further step of feed movement is then imparted to the variable tape and this brings about operation of relay group 95 through connections from the tape box 16 indicated by lines 96 and 97. Relay group 95 is connected with the relay 94 by way of a line 98. A time delay is incorporated in the relay group 95 similar to that incorporated in relay 84. By means of a circuit extending from relay 95 through relay 94 and a line 99 extending to the relay unit 18 the latter is released from its control over the electrotypesetter. Relay 92 is also released at this time. Simultaneously a circuit is completed from line 99 through line 64 to the magnet 51 to bring about release of the shaft 44 for a further single revolution. This will cause a repetition of the same operations which have been described above, by which the next code designations on the two tapes are compared and if an "accept" signal is provided in the variable tape in the seventh code position the information appearing on the standing tape and then that on the variable tape will be transmitted to the electrotypesetter.

Let us assume now that upon comparing the code designations on the two tapes these are found to correspond, but in the seventh position on the variable tape an Lf signal, which is a "reject" signal, is indicated. This will be transmitted from the decoder 25 through line 93 to relay 92 and then through line 100 to an arm mechanically connected with the switch arm 78, which as explained is operated by the cam 56 between the sixth and seventh feed movements of the tapes. The arm connected with line 100 will then engage a contact 101 and close a circuit through line 102 to a relay 103. The latter is connected with relay 91 which at this time is released and is connected by a line 104 with a relay 105. The latter serves to throw the control over the feeding movements of the standing tape to the more rapidly rotating shaft 37, which as explained is constantly driven. A commutator segment 38 on this shaft closes a power circuit through relay 105 and lines 216 and 106 to the line 68, which as previously explained brings about the stepping of the standing tape. A step of movement is imparted to the standing tape upon each revolution of the shaft 37. For the purpose of holding the relay 105 in the condition in which the advance of the tape is controlled by the shaft 37, commutator segments 39 and 40 are alternately effective. In Fig. 7 commutator 39 is indicated as closing a circuit from a power source through an arm 107 and a line 108 to the relay 105. Just before the arm 107 rides off of the commutator segment 39 an arm 109 is lifted by commutator segment 40 to close a circuit through line 110 to the relay 105. Power is supplied to this circuit from a source 110a through relays 91 and 105 and a line 111.

The high speed feeding of the standing tape takes place upon each revolution of the commutator 38, as the latter engages the contact element at the end of line 106, until the decoder 21, which is constantly analyzing the signals transmitted from the standing tape, receives a Cr signal, i. e. carriage return signal, from the tape. This Cr signal signifies the completion of the information on the tape in relation to the particular stock item which was rejected because of the fact that no transactions had occurred during the day in that stock.

Upon receipt of the Cr signal from the standing tape, the decoder 21 operates relay 88 through the line 87. Relay 88 is held in by a holding circuit. One further feeding movement of the standing tape takes place upon the next revolution of the shaft 37 and thus brings about operation of the relay group 84 in the manner previously explained in relation to the Cr signal. Relay 84 in conjunction with the previously operated and held relay 88 and released relay 82 serves to operate relay 91. This is brought about through connections indicated by the line 85a from relay group 84 to the relay 88 and thence through line 89 to the relay 91 to operate the latter. The above mentioned circuit and released relay 82 bring about delivery of current from the source in 84 to the magnet 51 through relays 88, 82, lines 85a, 89, and 112a. Relay 91 in turn releases relays 88, 103, and 105 and thus breaks the connection from the high speed cam or commutator shaft 37 and the circuits which cause feeding of the standing tape in response to rotation of this shaft. Control over the tape feeding operations of the two tapes in boxes 10 and 16 is given back to the control shaft 44, which as indicated has been released for another revolution through the operation of the magnet 51. This initiates the next comparing operation in which the code designations on the two tapes are compared to determine whether they correspond, and to determine whether the stock item identified with this next code designation is to be "accepted" or "rejected."

It will be understood that the same series of operations will continue so long as the code designations in the two tapes correspond, and thus a series of lines will be cast by the line casting machine carrying the information set-up on the standing and variable tapes in relation to the stocks which have been active during the day.

With the foregoing general understanding of the operation of the system, the various relays and circuits involved in a preferred embodiment of the invention will now be described in greater detail in relation to Figs. 8 to 11 inclusive. These figures form parts of a single circuit diagram which illustrates schematically the interconnection between the various parts of the system. To create the complete circuit, Figs. 8, 9, and 10 should be placed side by side with their longer dimensions disposed vertically, and Fig. 11 should be disposed horizontally, or transversely, at the center of the lower edge of the other three figures.

The various relays and relay groups, electrical connections, shafts, cams, commutators, and other devices indicated schematically in Fig. 7 are identified, so far as practicable, by the same reference numbers in Figs. 8 to 11 inclusive. Thus, there is shown in these figures the standing tape box 10, the cable 11 extending therefrom to the relay system 12 for the standing tape, and the cables 13 and 14 from the latter extending to the electrotypesetter 15. Similarly the variable tape box 16 is shown connected by a cable 17 with the relay system 18 for the variable tape, which is connected by the cables 13 and 14 with the electrotypesetter.

Power for operating the system is derived from a suitable direct current source 119 (Fig. 9) which delivers current to various bus lines in the system. These bus lines include the positive line 120 and negative line 121, which are in turn connected through lines 122 and 123 respectively with bus lines 124 and 125 (Fig. 11). The latter are in turn connected through lines 126 and 127 with other points in the system.

Tape box 10 is connected with the cable 11 by means of a Jones plug 130 having ten contact elements, only nine of which are utilized. Similarly, tape box 16 is connected with cable 17 by means of a Jones plug 131 having nine active contact elements. Cable 14 is connected with the electrotypesetter through a Jones plug 132 having ten active contact elements.

It will be noted that the contact elements numbered 1 to 6 and 8 to 9, inclusive, of Jones plug 130 are connected with separate switch arms in the relay unit 12. The first six of these contact elements are connected with respective ones of the six feeler pins 10a in the tape box 10. It will be understood that as the tape in the box is analyzed, certain ones of the feeler pins will pass through perforations in the tape to complete circuits through the corresponding contact elements of the Jones plug. Those contact elements numbered 1 to 5 are also connected through the cable 20 with respective ones of five solenoids 133 embodied in the decoder 21. All of the numbers 0 to 9 are represented by lines of perforations which include one in the 0 position. Therefore the feeler pin for that position is not connected with the decoder. The relationship between the perforations and the various symbols to be printed, and functions to be controlled, is indicated in Fig. 12. Each of the solenoids 133 serves to operate one or more related switch arms in the relay system embodied in the decoder. Thus the solenoid numbered 1 of this group operates a switch arm 134 to shift this toward the left. Normally switch arm 134 is in engagement with the contact indicated by the arrow at the right of it. However, when operated by the solenoid it is brought into engagement with the contact at the left. Similarly, solenoid No. 2 of the group 133 operates two switch arms 135 and 135a to shift these from their right hand contacts to their left hand contacts. Solenoid No. 3 shifts the four switch arms 136, 136a, 136b, and 136c from their right hand contacts into engagement with their left hand contacts. Solenoid No. 4 shifts switch arms 137, 137a, 137b, 137c, 137d, 137e, and 137f from their right hand contacts to their left hand contacts. Solenoid No. 5 shifts switch arms 138, 138a, 138b, and 138c from their right hand contacts to their left hand contacts. Depending upon which of the solenoids may be operated upon analyzing the perforations along a particular line in the tape, the various switch arms of the relay system 21 will assume predetermined positions which at times will serve to complete one or another of a plurality of circuits. Contact element numbered 7 of 130 is connected to positive bus line 120.

In a similar way the eight contacts numbered 1 to 6 and 8 to 9 of the Jones plug 131 will be connected through the cable 17 with the relay system 18 for appropriate control of the electrotypesetter when the relay system 18 is properly conditioned for such control. Contacts 1 to 6, inclusive, are connected with respective ones of six feeler pins in the box 16 in the manner indicated for box 10. Other contacts are connected with a tape stepping and feeler pin retracting magnet, as in the case of box 10. Contacts 1 to 5 of Jones plug 131 are also connected through cable 24 with respective ones of a group of solenoids 139. Each of these is arranged to operate one or more switch arms in the relay unit 25 for the variable tape. Solenoid No. 1 operates switch arm 140 to shift it from the right hand contact to the left hand contact. Solenoid No. 2 similarly operates switch arms 141 and 141a. Solenoid No. 3 operates switch arms 142—142c. Solenoid No. 4 operates switch arms 143—143f, and solenoid No. 5 operates switch arms 144—144c. Contact element numbered 7 of 131 is again connected to positive bus line 120.

A large number of other relays are included in the system and it should be understood that the various switch arms of these relays are normally spring biased in a direction away from the coils indicated for these relays. This may be referred to as the normal or released condition of the relays. When these relays are energized the various switch arms are to be considered as shifted toward the coils into engagement with the contacts in the direction of the coils. As has been explained, a plurality of holding circuits are included in the system for retaining certain of the switch arms in their attracted, or non-normal positions when they are shifted in response to the closing of various circuits.

Starting Operations

Now assuming that the system has been in operation and is connected with the power source 119, but the operation of the system has been interrupted or stopped for some reason, it is set into operation by first operating switches 60 and 61 (Figs. 9 and 11) to release certain of the holding circuits. Switch 62 is then operated to set the system into operation. Closing of this switch momentarily delivers current to the magnet 51 from positive line 122 by way of line 196 and back to the source through negative line 123. Upon operation of the magnet 51, the shaft 44 will be released for operation through the friction driving means explained above. As soon as the shaft 44 starts to turn, the bump on cam 52 will engage switch arm 65 and break the connection between contacts 65b. This will break the circuit from bus line 124 through the switch arm 65 and line 65a to the switch arm 145 of relay 94, which was at this time being held against the contact shown, the holding circuit for relay 94 being active at the time; this circuit was previously completed through coil 146 and line 147 to the negative bus line 125. Breaking of the circuit through the solenoid 146 in this manner will cause the several switch arms 145, 145a, and 145b of relay 94 to shift away from the coil 146 into the positions shown, i. e. this relay will be released.

Code comparing operation

Simultaneously the feeler pins in the two tape boxes 10 and 16 will be operated to sense the perforations in the two tapes then alined with the feeler pins. The tape in the standing box, as indicated in Fig. 2, will, in the first line, have a single perforation in the No. 2 position which is identified with line feed (Lf). This has no significance in relation to the control system under discussion. It is of significance only in the control of the telegraphic printer, which as explained is operated simultaneously with the formation of the punched tape. It should be explained in connection with the tapes of Figs. 2 and 3 that the location of the perforations in a particular line is identified as 0, 1, 2, 3, 4 and 5 from the top to bottom of the tape. The variable tape has no perforations in the first line in any of the six positions indicated. It is simply provided with a small tape feed opening at the center of the tape. This performs no function in the control system under discussion and is identified only with the tape feeding function in the course of forming the punched tape simultaneously with the printing of a record on a telegraphic printer.

After a sufficient time has elapsed for the sensing operation of the two tape boxes, the first bump on the cam 53 (Fig. 11) will engage the switch arm 66 to close the contacts 66a and complete a circuit which will bring about operation of the tape feeding magnets in the two tape boxes. This circuit is completed as follows: from the negative bus line 125, through line 75, then the switch arm 74a of the relay 74 and the line 76 to the switch arm 66. From the latter, parallel circuits extend through lines 67 and 68 to the contacts numbered 9 of the Jones plugs connected with the variable tape and standing tape boxes, respectively. From the contacts 9 the circuit passes through the tape feeding magnets, that in box 10 being indicated at 10b, and then to the contact numbered 7 in each box, this contact being connected into the positive bus line 120. The tape stepping magnets first serve to retract the feeler pins and then impart a single step of advance to the two tapes; the feeler pins are then released for spring actuation to sense the perforations in the tapes for the second line of perforations identified with the seven code positions. While the feeler pins are so operated, the first bump on the cam 54 will lift the switch arm 70 into engagement with a contact at the end of a line 151 which is connected through the solenoid of the relay 72 and a line 150 to the negative bus line 125. Assuming that the tape perforations are as shown in Figs. 2 and 3 there will be perforations in the 0, 2, 3, and 5 positions on both tapes. This will bring about operation of the solenoids numbered 2, 3 and 5 in the groups 133 and 139. A circuit will thus be completed from the switch arm 70 through line 71, switch arms 134, 135a, 136b, 137d and 138a to the line marked 0 in Fig. 8. From this point the circuit continues through a line 153 to the line marked 0 in the decoder for the variable tape (Fig. 10). From here the circuit extends through switch arms 144a, 143d, 142b, 141a, and 140 to the positive bus line 120. Since this indicates proper correspondence between the perforations in the two tapes and a circuit is completed through the solenoid of relay 72, a switch arm 154 in the latter will be operated to break a connection which normally exists from negative bus line 125 through line 150, arm 154, and line 72a to a contact 155.

Stopping of system when code designations do not conform

Let us now assume that the perforations in the two tapes do not coincide at the particular points in the code designations being analyzed and compared. The circuit through the decoding units 21 and 25 and through the solenoid of relay 72 will not be completed. Therefore the arm 154 will remain engaged with the contact at the end of line 72a. A circuit will then be completed from the negative bus line 125 through line 150, switch arm 154 to contacts 155 which will be engaged by the switch arm 73 as the first bump on the cam 55 engages this switch arm. This will occur shortly after the first bump on cam 54 has engaged and lifted switch arm 70 and while the latter remains lifted. Under the assumed conditions, closing of the circuit between contacts 155 and switch arm 73 will pass current through the solenoid of relay 74 and through line 156 to the positive bus line 124. Simuletaneously a circuit is completed from arm 73 through line 157 and the lamp 77 to line 156 and the bus line 124. In energizing the relay 74 a circuit will be completed from the postive bus line 124 through line 156, then through the red light 77, and a parallel path through the solenoid of relay 74 and line 157, thence the arm of switch 61 and a line 158 to a switch arm 74a which will have been shifted toward the right by the operation of the relay 74. The circuit is completed from this point through the line 75 to the negative bus line 125. The operation of the relay 74 serves to break the tape stepping circuit which, as previously explained, involves the line 75, switch arm 74a, and line 76. This circuit will be broken between the switch arm 74a and line 76. Accordingly, further opertaion of the system will be arrested and the red light 77 will remain on until the operator corrects the difficulty.

Continued operation when code numbers coincide

Now returning to the first assumption, in which the perforations being compared in the two tapes have coincided, the relay 72 will have been energized and the relay 74 will not have been energized, so that upon the engagement of the second bump on the cam 53 with the switch arm 66 the two tapes will be advanced another step in the manner explained, and the feeler pins of the two tape boxes will analyze the next line of holes in the tapes. Assuming this line is as indicated in Figs. 2 and 3, another circuit will be completed through the zero lines of the two decoders and the tapes will be advanced again. This will be repeated for the fourth positions on the tapes. Again assuming that the tapes coincide, the engagement of the fourth bump on the cam 53 with the switch arm 66 will shift the tapes to present the fifth line of perforations in the path of the feeler pins, and at this time a circuit will be completed through a different path in the decoding relays 21 and 25 as the fourth bump on the cam 54 operates switch arm 70. This new path, which corresponds with the digit 1, extends from switch arm 134 through arm 135, arm 136a, arm 137b, to line 1 and thence through a line 153a to the line marked 1 in the decoder 25. From here the circuit is completed through switch arms 143b, 142a, 141 and 140 to the positive bus lines 120.

The "accept" signal and related operations

As the operation of the comparing unit continues, the fifth bump on the cam 53 will bring into the path of the feeler pins for the two tapes the sixth line of perforations. In the standing tape there is simply a line feeding perforation in this line and this is ineffective to close any circuit in the system. In the variable tape the feeler pins will pass through apertures in the 1 and 2 positions which correspond with the "accept" signal a. This will throw the switch arms in the decoder 25 to connect the bus line 120 with the line marked a. However, no circuit will be completed since the line 159 extending from this point to the switch arm 78 cooperating with the cam 56 will not complete a circuit through the arm 78 at this time. Nothing will occur, however, to prevent the further stepping of the tapes as the sixth bump on the cam 53 actuates the switch arm 66. At this time the same situation will exist as just explained, since the standing tape has merely a tape feeding perforation and the variable tape again has perforations in the 1 and 2 positions identified with the "accept" signal. While the feeler pins are cooperating with the variable tape at this time the bump on the cam 56 will operate the switch arm 78 and will complete the circuit which we have previously traced to this point. The circuit then extends downwardly and then toward the right through the line 100 and then up to the relay 80 (Fig. 9), and will pass through the coil in this relay and then through line 60a to the switch 60 and then to the negative bus line 121. In thus completing the circuit through the coil of relay 80 and switch 60 to the negative bus line 121, certain holding circuits will be energized. Thus, the switch arm 164 of relay 80 will be operated to engage the contact 165. This will complete a holding circuit through the solenoid of the relay 80 which may be traced from negative line 121 through the solenoid of relay 80, contact 165, arm 164, lines 164a and 166 (Figs. 9 and 11), thence in parallel through arms 168 and 170 to line 169, and then up, through the arm 92d of relay 92, over and down through line 169a and parallel switch arms 145b and 171 to the positive line 126. At this time also the relay 82 will be energized. The circuit for this purpose extends from the negative bus line 127 through the solenoid of relay 82 to a line 82a which extends upwardly to the relay 80 and is connected with a switch arm 80a in the latter. This switch arm at the time is in its operated position and engages a contact at the end of a line 80b which is connected to the positive bus line 120. As a result of actuation of the relay 82 its two switch arms are shifted toward the right. This sets up a holding circuit from negative line 127 through the coil of relay 82 then through arm 161a and a line 161b to arm 145a of relay 94 back to positive line 126.

Now upon engagement of the seventh bump on the cam 53 with the switch arm 66, the usual circuits will be completed to the tape stepping magnets in the two tape boxes. At the same time a circuit will be completed through one of the relays in group 84. This circuit is as follows: from the negative bus line 125 through line 75, switch arm 74a and line 76 to the switch arm 66, thence from the latter through line 68 to a line 83 through the coil 84a in the group of relays 84 and thence through a line 84b to the positive bus line 124. The current thus flowing through coil 84a will cause the arm 84c to engage a contact at the end of line 84d. This will complete a circuit through the coil 84e of the relay group 84 as follows: from the positive bus line 124 through line 84b, switch arm 84c, line 84d, a resistance 84f, preferably of about 150 ohms, then through coil 84e, and in parallel therewith through condenser 84g. The circuit then continues through a line 84h to the negative bus line 125. Actuation of the switch arms in the relay group 84 completes a circuit through the solenoid of the relay group 12. This circuit may be traced as follows: from the negative bus line 121 through switch 60, through the coil 12a of relay group 12, thence through a line 173 to a contact which at this time is engaged by a switch arm 172 in the relay group 84, through the latter to a line 174 which extends to the relay 80. As explained, the switch arm 80c in the latter will at this time be engaged with a contact at the end of a line 80d which is connected with line 166 and through the latter is connected with switch arm 170 of relay 88 to the line 169 which extends upwardly to relay 92 and then downwardly to the switch arm 145b of relay 94 which is connected with the positive bus line 126. The circuit through the coil 12a is held by the operation of a switch arm 175 which is at this time shifted downwardly to close the contacts shown and thereby connects the left end of the coil to the line 164a which completes the circuit through lines 166 and 169, in the manner explained, to the positive line 126.

Operation of the relay 12 by completing the circuit through coil 12a in the manner explained will serve to rock all of the switch arms in the relay downwardly to connect the eight lines in the cable 11 from the Jones plug 130 to the corresponding contacts in the Jones plug 132. This serves to place the electrotypesetter under the control of the standing tape box 10. At this time the circuits disclosed in the above mentioned Ackell application will come into play so that the feeding of the tape in the tape box 10 will be controlled by the electrotypesetter and the latter will in turn be controlled by the perforations in the tape. Thus the matter appearing in Fig. 4 relative to the stock No. 0001 will be set up in the electrotypesetter until the Cr signal is reached at the end of this data on the standing tape. It will be understood that the circuits from the tape box 10 to the decoder 21 will be effective at all times to shift the switch arms of decoder 21 in accordance with the perforations in the tape, but in the setting up of the data prior to the Cr signal no circuit will be completed through the various switch arms of decoder 21. However, when the Cr signal is transmitted to the decoder the single perforation in the number 4 position identified with this signal will throw the switch arms 137—137f toward the left while the remaining switch arms in the decoder will remain in their righthand positions. This will complete a circuit to the line 176 marked Cr in the drawing. That circuit may be traced as follows: from line 176 which extends to and through coil 88a of relay 88, then through line 177 over to switch arm 91a of relay 91, which at this time will be inactive. From arm 91a the circuit extends to the negative bus line 127. In the opposite direction from the line 176 the circuit extends through switch arms 138b, 137f, 136c, 135a, and 134 to line 71 which is connected with the switch arm 70 (Fig. 11). The latter is at this time engaged with the lower contact at the end of a line 179 which extends upwardly to the positive bus line 124. It will be noted that a circuit is thus completed through the relay 88 and this will swing a switch arm 88b in the latter into engagement with the contact shown and thus complete a holding circuit for the relay. This may be traced from the positive bus line 124 through line 180 and through arm 88b and coil 88a to line 177 which, as indicated before, extends through arm 91a of relay 91 to negative bus line 127. In thus operating relay 88 and setting up a holding circuit therefor, the system will be placed in readiness for release of the relay unit 12 and relay 80 upon the final stepping of the tape in the tape box 10 under control of the electrotypesetter.

It should be understood that to bring about stepping of the tape under control of the electrotypesetter the latter has a negative line connected from terminal 9 of Jones plug 132 to the corresponding terminal of Jones plug 130 through relay unit 12 and that the positive line is connected to the No. 7 terminals of these two plugs. From the negative line connected with the terminal 9 the line 68 previously described extends down to the line 83 (Fig. 11) and completes a circuit through coil 84a of relay group 84 to the positive bus line 124. This circuit is in parallel with that through the stepping magnet of box 10. Energizing of coil 84a, as explained hereinbefore, completes a circuit from positive bus line 124 through line 84b, switch arm 84c, line 84d, and the coil 84e of the other relay of this group to line 84h connected with the negative bus line 125. The circuits are thus completed through the two relays of group 84 upon each stepping of the tape under control of the electrotypesetter. However, until the relay 88 has been energized, this does not break the circuits through the coil 12a of relay unit 12 and the coil of relay 80. This is because the line 166 is connected to line 169 through the arm 170 of relay 88 as the arm 168 of relay group 84 is attracted by the solenoid 84e to break the circuit between line 167 and arm 168. However, when relay 88 is energized and arm 170 is shifted toward the left, the energizing of coil 84e will break the circuits through the line 166 to and through the coil 12a and the coil of relay 80, which have been held, up to this time, through the connection of line 166 with line 169 through one or the other or both of arms 168 and 170. Upon breaking of the circuit through coil 12a the switch arms of the relay unit 12 will be restored to their upper positions, and the connection from tape box 10 to the electrotypesetter will be broken. At the same time, or immediately following this the relay unit 18 will be energized to connect the variable tape box 16 with the electrotypesetter. The circuit for this purpose through the coils of relays 18 and 92 may be traced as follows: A circuit is employed through the coil of relay 91 upon the energizing of coil 84e of relay unit 84 when relay 88 is held, this circuit being through the line 180 extending from positive bus line 124 to and through switch arm 88c of relay 88, then through line 181 to the switch arm 84k, which will at this time engage the contact shown, upon the temporary energizing of coil 84e. The opposite end of switch arm 84k is connected by line 162 and a branch line 163 (Fig. 11) with the coil of relay 91, the opposite end of this coil being connected into negative line 127. Line 162 continuing upwardly above the branch line 163 completes a further circuit through arm 161 of relay 82, which will at this time be shifted to its righthand position into engagement with the contact at the end of line 160. The latter is connected with one end of the coil 92b (Fig. 9), the opposite end of which is connected by line 182 with the line 60a, which through switch 60 is connected to the negative bus line 121. Simultaneously a circuit is completed in parallel with coil 92b through coil 18a of relay unit 18. This serves to connect the electrotypesetter with the variable tape box 16 through the eight wires of cable 17 and Jones plug 131. As explained above, the relay unit 12 will have been released prior to this so that the electrotypesetter is disconnected from the tape box 10. The resistor-condenser circuit 84f—84g incorporated in relay group 84 provides a time-delay in the releasing of relay coil 84e of group 84. This is important in the above described operation of release of relays 12 and 80 and the subsequent energizing of relays 18 and 82. As it was traced before, the energizing circuit for relay coils 18a and 92b goes through operated switch arm 84k of relay coil 84e. However, 84e derives its energizing circuit through the operated switch arm 84c of relay coil 84a, which in turn derives its energizing circuit through lines 83, 68 and thence relay 12, which has been released just prior to this time. Thus, in order to accomplish the above described operations, relay 84e has to be held momentarily after the removal of its energizing circuit. Condenser 84g does this momentary holding action by its stored energy.

A holding circuit through the coils 18a and 92b is provided through the operation of switch arm 92c of relay 92 to complete a circuit from line 182 through the two coils, then through the arm 92c and a line 184 to a line 185 which is connected at 186 to the line 169a. The latter, as previously explained, is connected through arm 145b of relay 94 with the positive line 126. The energizing of 92 breaks the connection from the line 169a to line 169 at switch arm 92d; this in turn prevents relays 12 and 80 from being energized.

Operation of relay 91, in the manner explained, serves to release relay 88, since the circuit through line 177 extending from relay 88 is broken as the arm 91a of relay 91 is shifted toward the right. A holding circuit for relay 91 is created, however, as follows: from negative line 127, through the coil of relay 91, then line 163 to line 162, through arm 161 (now in its righthand position) to line 169, from the latter through arm 92c of relay 92, then through lines 184, 185, and 169a and through switch arms 145b and 171 to line 97 and the positive line 126.

The operation of the electrotypesetter 15 now continues under the control of the tape box 16 and in turn serves to transmit the necessary signals to the latter for stepping the tape in the box 16 at the appropriate time. The data on the variable tape with respect to the particular stock, i. e. No. 0001 in the example being described, will be set up on the line casting machine in the same line as the corresponding data previously set up under the control of the standing tape. This is carried out in accordance with the system disclosed in the above mentioned Ackell application until the final signal in the variable tape is reached. This, it will be noted, is a line feed (Lf) signal. When this is reached a circuit is completed through the decoding relay group 25 which, it will be understood, is constantly connected with the tape box 16 but becomes active to modify the control circuits only in response to the Lf signal. This signal, incidentally, serves to control the operation of the elevator in the electrotypesetter. It simultaneously completes a circuit through the control system as follows: from positive bus line 120 through switch arms 140, 141a, 142b, and 143e, to line 187, identified as Lf in Fig. 10. In this connection it should be noted that the Lf signal is created by a single perforation in the tape in the No. 2 position. From the line 187 the circuit extends upwardly to switch arm 92a of relay 92 which at this time will be engaged with the contact at the end of line 99. This line continues the circuit downwardly to the coil 146 of relay 94 and from this through line 188 to the negative bus line 127. Operation of the relay 94 in this manner serves to swing the arm 145b toward the right and thus breaks the circuit between this arm and line 169a, which, as explained above, forms a part of the holding circuit for the relays 18 and 92. These relays will, however, not be released at this time since the circuit is still completed from line 169a through switch arm 171 to the positive line 126. A holding circuit will be energized for the relay 94 by swinging of the switch arm 145 toward the left. This completes a circuit from positive line 124 through line 189, then through contacts 65b, arm 65, line 65a, switch arm 145, coil 146 and line 188 to the negative line 127. Operation of relay 94 serves to release relay 82 by swinging arm 145a toward the right and breaking the holding circuit for relay 82 at the point where arm 145a normally engages the contact at the end of line 161b. The release of relay 82 also brings about the release of relay 91, since the holding circuit for the latter will be broken between the contact at the lower end of line 160 and the arm 161 which will now have shifted to the left.

Now, upon the final stepping of the tape in the tape box 16, which occurs promptly after the relay 94 has been operated as explained, a circuit is completed from the negative side of the tape stepping magnet, through line 67, branch line 96, through coil 190 of relay group 95, to line 97 and the positive line 126. This will set-up a circuit, with a suitable time delay, from positive line 126 through arm 191 of relay group 95, which arm will at this time be shifted toward the left, then through a line 192 to and through coil 193 of relay group 95 to line 194 which is connected with the negative bus line 125. This will serve to shift the arm 171 toward the right and thus break the holding circuit through the relays 18 and 92, so that these relays will be released and the control over the typesetter from tape box 16 will be disconnected. All of the circuits are now in the condition they were in at the commencement of the operation of the system. The several holding circuits through the switches 60 and 61 will have been released.

Energizing of the coil 193 of relay group 95 will also cause switch arm 195 to shift toward the left and thus complete a circuit through the magnet 51, as follows: from positive line 126, through arm 145a of the held relay 94, then through line 98, arm 195 and a line 196 to one terminal of magnet 51, the opposite terminal of which is connected with the negative bus line 125. This will result in release of the shaft 44 for another revolution and thus bring about a repetition of the same code comparing cycle. A resistor-condenser circuit is incorporated with relay group 95 for necessary momentary holding and time delays in the same manner as has been described before in connection with the resistor-condenser circuit incorporated with relay group 84. As explained, the first thing which occurs in this cycle is the release of relay 94, by breaking the holding circuit for the latter at the contacts 65b. If the code numbers in the two tapes coincide and if the code of the variable tape ends with an "accept" signal, the control of the electrotypesetter, first by the standing tape and then by the variable tape, will be repeated. The system will continue to operate in this way automatically so long as the code designations in the two tapes correspond and the variable tape carries the accept signal for the successive stock code numbers. We have already described what takes place in the event that the code numbers in the two tapes do not coincide.

*The "reject" signal and related operations*

Let us now consider what takes place when the variable tape has a "reject signal" in lieu of an "accept signal" for a particular stock identified by the code perforations. The shaft 44 will be released, as in the normal case, for one revolution to bring about the comparison of the two code numbers. As the seventh line of perforations in the two tapes identified with the code number are brought into line with the feeler pins a line feed signal will be transmitted by the variable tape. This will close a circuit from the positive bus line 120 through the arms 140, 141a, 142b, and 143e of the decoder 25 to the line 187. The latter will continue the circuit through the arm 92a of relay 92 which at this time will be in its released condition. From here the circuit continues through a line 197 down and then over to a contact disposed adjacent the cam 56 on the shaft 44. While the circuit is thus completed up to this point, the bump on cam 56 will lift the switch arm 198 to engage its contact with that at the end of line 197 and will thus complete the circuit through line 199, coil 200 of relay 103, and line 201 to the neegative line 127. Upon energizing the relay 103 in this manner the arm 202 will be drawn toward the left and will thus complete a holding circuit from negative line 127 through line 201, coil 200, arm 202, line 203, arm 91b of relay 91, which at this time is in released condition, then to positive line 126. Another circuit is also completed from positive line 126 through switch arm 204, to a line 205 connected with arm 91c of relay 91, and from the latter through lines 206 and 207 to the coil 208 of relay 105, from which the circuit is completed through line 209 to the negative line 127. This circuit is completed only when the high part of cam or commutator disk 40 engages and lifts the arm 207. When relay 105 is thus energized, it draws the arms 210 and 211 toward the right into engagement with the indicated contacts. A holding circuit is then completed through the coil 208 of relay 105 through the combined, overlapping action of commutator disks 39 and 40. When cam 39 is not effective, the cam 39 will be effective through a circuit from the positive line 126, through arm 211, line 212, contacts 213, which are at this time held closed by the segment on commutator 39, then through line 214 and coil 208 to line 209 connected into the negative line 127. Closing of the switch arm 210 completes a circuit for the stepping of the standing tape once upon each revolution of the continuously driven shaft which carries the commutator disks 38, 39, 40. As the segment of commutator disk 38 lifts a switch arm 215, a tape stepping circuit is completed as follows: from negative line 127 through arm 210, a line 216, a switch arm 215 to the line 106 which is connected into line 68 extending upwardly to the ninth prong on the Jones plug 130. From here the circuit is completed through the tape stepping magnet of box 10 to the terminal 7 which, as explained, is connected into positive bus line 120.

Rapid stepping of the standing tape will thus take place upon successive revolutions of the shaft carrying the commutator disks 38, 39 and 40 until the Cr signal is reached at the end of the information on the standing tape relating to the particular stock in question. When that signal is reached a circuit will be completed in the manner previously explained through the decoding relay system 21 to the line 176, this circuit then extending through the coil of relay 88 and through line 177 to and through the arm 91a of relay 91 to the negative line 127. The connection from positive bus line 124 to the decoding relay unit 21 is through line 179, switch arm 70, and line 71. Operation of relay 88 causes arms 88b and 88c to be drawn against their contacts. Arm 88b thus creates a holding circuit through the coil 88a, in the manner explained, from the positive bus line 124 through line 177 and switch arm 91a to the negative line 127. Upon the next tape stepping pulse created by the cam 38 the relays of group 84 will be energized in the manner explained before. The circuit through coil 84a will at this time be from positive bus line 124 through the coil, then lines 83, 68 and 106, arm 215, line 216, and arm 210 to the negative line 127. Operation of relay group 84 and previous operation of the arm 88c closes a circuit from the positive bus line 124 through the line 181, arm 84k, line 162, line 163, and the coil of relay 91 to the negative line 127, thus operating relay 91. The operation of relay 91 serves to release relay 88 since the circuit through the coil of the latter is then broken by the attraction of the arm 91a away from the contact at the end of line 177. In addition, the operation of relay 91 serves to break the holding circuit through the coil 200 of relay 103 at switch arm 91b and thus releases this relay. Relay 105 is also released at this time due to the energizing of relay 91 which breaks the circuit for 105 at arm 91c and interrupts the high speed stepping of the standing tape under control of the cam 38. Simultaneously with the energizing of the relay 91, a circuit is completed through the coil of magnet 51 to release the shaft 44 for another revolution and thus set in motion the next code designation comparing operation. The circuit through the coil of magnet 51, which starts this new cycle, continues from the positive side of the power source, through line 162, arm 161 of the now released relay 82, through lines 217 and 196 to one side of the magnet 51, the opposite side of the magnet being connected with the negative bus line 123.

The various conditions which may be encountered in the operation of the system have now been fully described. It will be understood that the various controls explained will come into operation as the perforations in the two tapes call for the different types of control. The system will operate automatically and continuously to set up all of the desired information represented by the perforations in the two tapes except under the conditions explained, when the two code numbers being compared do not correspond.

While an illustrative embodiment of the invention has been described in considerable detail, it will be understood that various changes and additions may be made without departing from the general principles and scope of the invention.

What is claimed is:

1. Control means for a line casting machine which comprises an electro-typesetter having a plurality of circuits for controlling the operation of said machine, a plurality of perforated tapes each having groups of perforations corresponding with a portion of a line to be cast, means for advancing said tapes successively, means for analyzing successive groups of perforations in the several tapes, and separate electrical circuits closed selectively in accordance with the analysis of the perforations in the tapes by said analyzing means, said circuits being alternately coordinated with said circuits in said electro-typesetter under the control of one of said tapes and then another and being arranged to be closed selectively through said circuits in said electro-typesetter under such control for controlling the operation of said machine, selected circuits being closed firstly in accordance with the perforations in one of said tapes and then in accordance with the perforations in another of said tapes in the course of casting a single line.

2. Control means for a line casting machine which comprises an electro-typesetter having a plurality of circuits for controlling the operation of said machine, a plurality of perforated tapes each having groups of perforations corresponding with a portion of a line to be cast, means for advancing said tapes successively, means for analyzing successive groups of perforations in the several tapes, and electrical circuits closed selectively in accordance with the analysis of the perforations in the tapes by said analyzing means, said circuits being alternately coordinated with said circuits in said electro-typesetter under the control of one of said tapes and then another and being arranged to be closed selectively through said circuits in said electro-typesetter under such control for controlling the operation of said machine, selected circuits being closed firstly in accordance with the perforations in one of said tapes and then in accordance with the perforations in another of said tapes in the course of casting a single line, said circuits including devices for automatically shifting control of said line casting machine from one of said perforated tapes to another in cyclic succession in the casting of a plurality of lines.

3. Control means for a line casting machine which comprises an electro-typesetter having a plurality of circuits for controlling the operation of said machine, a plurality of perforated tapes each having groups of perforations corresponding with a portion of a line to be cast, said tapes also having code perforations therein identified with the lines to be cast, means for analyzing successive groups of perforations in the several tapes, means for advancing said tapes successively, electrical circuits selectively completed by said analyzing means for comparing the code perforations in said tapes, means for disabling said tape advancing means whenever the code perforations being compared in the two tapes do not coincide, and separate electrical circuits coordinated with said circuits in said electro-typesetter and arranged to be closed selectively through said circuits in said electro-typesetter under control of said analyzing means in accordance with said groups of perforations in the tapes for controlling the operation of said machine firstly in accordance with the perforations in one of said tapes and then in accordance with the perforations in another of said tapes in the course of casting a single line.

4. Control means for a line casting machine which comprises an electro-typesetter having a plurality of circuits for controlling the operation of said machine, a plurality of perforated tapes each having groups of perforations corresponding with a portion of a line to be cast, said tapes also having code perforations therein identified with the lines to be cast, means for advancing said tapes successively, means for analyzing successive groups of perforations in the several tapes, electrical circuits selectively completed by said analyzing means for comparing the code perforations in said tapes, attention attracting means operable automatically when the code perforations in the tapes do not coincide, and electrical circuits connected with the analyzing means for each of said tapes and alternately coordinated with said circuits in said electro-typesetter and arranged to be closed selectively through said circuits in said electro-typesetter under control of said analyzing means in accordance with said groups of perforations in the tapes for controlling the operation of said machine firstly in accordance with the perforations in one of said tapes and then in accordance with the perforations in another of said tapes in the course of casting a single line.

5. Control means for a line casting machine which comprises an electro-typesetter having a plurality of circuits for controlling the operation of said machine, a plurality of perforated tapes each having groups of perforations corresponding with a portion of a line to be cast, means for advancing said tapes successively, means for analyzing successive groups of perforations in the several tapes, electrical circuits coordinated with said circuits in said electro-typesetter and arranged to be closed selectively through said circuits in said electro-typesetter under control of said analyzing means in accordance with said groups of perforations in the tapes for controlling the operation of said machine firstly in accordance with the perforations in one of said tapes and then in accordance with the perforations in another of said tapes in the course of casting a single line, and devices controlled by said analyzing means in accordance with certain perforations in one of said tapes for preventing control of said line casting machine by another of said tapes.

6. Control means for a line casting machine which comprises an electro-typesetter having a plurality of circuits for controlling the operation of said machine, a plurality of perforated tapes each having groups of perforations corresponding with a portion of a line to be cast, means for advancing said tapes successively, means for analyzing successive groups of perforations in the several tapes, electrical circuits connected with the analyzing means for each of said tapes and alternately coordinated with said circuits in said electro-typesetter and arranged to be closed selectively through said circuits in said electro-typesetter under control of said analyzing means in accordance with said groups of perforations in the tapes for controlling the operation of said machine firstly in accordance with the perforations in one of said tapes and then in accordance with the perforations in another of said tapes in the course of casting a single line, and devices controlled by said analyzing means in accordance with certain perforations in one of said tapes for preventing control of said line casting machine by another of said tapes, said last mentioned devices including means for causing rapid operation of said means for advancing said another of said tapes.

7. Control means for a line casting machine which comprises an electro-typesetter having a plurality of circuits for controlling the operation of said machine, a plurality of perforated tapes each having groups of perforations corresponding with a portion of a line to be cast, means for advancing said tapes successively, means for analyzing the perforations in said tapes, electrical circuits including relays controlled by said analyzing means in cooperation with certain perforations in one of said tapes for determining when a line is to be cast, and electrical circuits including relays controlled by said analyzing means connected with the analyzing means for each of said tapes and alternately coordinated with said circuits in said electro-typesetter and arranged to be closed selectively through said circuits in said electro-typesetter under control of said analyzing means in accordance with said groups of perforations in the tapes when said first mentioned circuits call for the casting of a line for controlling the operation of said machine, firstly in accordance with the perforations in one of said tapes and then in accordance with the perforations in another of said tapes in the course of casting a single line.

8. Control means for a line casting machine which comprises an electro-typesetter having a plurality of circuits for controlling the operation of said machine, a plurality of perforated tapes each having groups of perforations corresponding with a portion of a line to be cast, said tapes also having code perforations therein identified with the lines to be cast, means for advancing said tapes successively, means for analyzing successive groups of perforations in the several tapes, electrical circuits selectively completed by said analyzing means for comparing the code perforations in said tapes, means for disabling said tape advancing means whenever the code perforations being compared in the two tapes do not coincide, devices controlled by said analyzing means in accordance with certain code perforations in one of said tapes for determining whether information represented by perforations in another of said tapes shall be set-up on said line casting machine, and electrical circuits coordinated with said circuits in said electro-typesetter and arranged to be closed selectively through said circuits in said electro-typesetter under control of said analyzing means in accordance with said groups of perforations in the tapes when said last mentioned devices predetermine the setting-up on said line casting machine of the information on said other of said tapes for controlling the operation of said machine firstly in accordance with the perforations in one of said tapes and then in accordance with the perforations in another of said tapes in the course of casting a single line.

9. Control means for a line casting machine which comprises an electro-typesetter having a plurality of circuits for controlling the operation of said machine, a plurality of perforated tapes each having groups of perforations corresponding with a portion of a line to be cast, said tapes also having code perforations therein identified with the lines to be cast, means for advancing said tapes successively, means for analyzing successive groups of perforations in the several tapes, electrical circuits selectively completed by said analyzing means for comparing the code perforations in said tapes, means for disabling said tape advancing means whenever the code perforations being compared in the two tapes do not coincide, devices controlled by said analyzing means in accordance with certain code perforations in one of said tapes for determining whether information represented by perforations in another of said tapes shall be set-up on said line casting machine, means for more rapidly advancing said other tape when the information represented by perforations therein is not to be set-up on said line casting machine, and electrical circuits coordinated with said circuits in said electro-typesetter and arranged to be closed selectively through said circuits in said electro-typesetter under control of said analyzing means in accordance with said groups of perforations in the tapes when said last mentioned devices predetermine the setting-up on said line casting machine of the information on said other of said tapes for controlling the operation of said machine firstly in accordance with the perforations in one of said tapes and then in accordance with the perforations in another of said tapes in the course of casting a single line.

10. A control system for a line casting machine which comprises an electro-typesetter having a plurality of circuits for controlling the operation of said machine, a plurality of tape boxes each adapted to advance a perforated tape step by step therethrough and to analyze successive lines of perforations in the tape, electrical connections from each of said tape boxes to the electro-typesetter circuits for controlling the operation of the line casting machine, means for separately interrupting the connections between each of said tape boxes and said line casting machine, a relay group connected with each tape box and arranged for repeated adjustment in accordance with the perforations in successive regions of the tape, and electrical circuits interconnecting said tape boxes when the several relay groups coincide in their settings, said circuits including relays arranged to control said means to selectively interrupt the electrical connections between one or another or all of said tape boxes and said line casting machine.

11. A control system for a line casting machine which comprises an electro-typesetter having a plurality of circuits for controlling the operation of said machine, a plurality of tape boxes each adapted to advance a perforated tape step by step therethrough and to analyze successive lines of perforations in the tape, electrical connections from each of said tape boxes to said electro-typesetter for controlling the operation of said machine, means for separately interrupting the connections between each of said tape boxes and said electro-typesetter, a relay group connected with each tape box and arranged for repeated adjustment in accordance with the perforations in successive regions of the tape, and electrical circuits interconnecting said tape boxes when the several relay groups coincide in their settings, said circuits including relays arranged to control said means to selectively interrupt the electrical connections between one or another or all of said tape boxes and said electro-typesetter, said circuits also including devices for interrupting the operation of said system when the several relay groups fail to coincide in their settings.

12. A control system for a line casting machine which comprises an electro-typesetter having a plurality of circuits for controlling the operation of said machine, a plurality of tape boxes each adapted to advance a perforated tape step by step therethrough and to analyze successive lines of perforations in the tape, electrical connections from each of said tape boxes to said electro-typesetter for controlling the operation of said machine, means for separately interrupting the connections between each of said tape boxes and said electro-typesetter, a relay group connected with each tape box and arranged for repeated adjustment in accordance with the perforations in successive regions of the tape, electrical circuits interconnecting said tape boxes when the several relay groups coincide in their settings, said circuits including relays arranged to control said means to complete the electrical connections between one of said tape boxes and said electro-typesetter, and circuits completed through said relay group connected with said one of said tape boxes in response to the sensing of certain perforations in the tape therein to so control said means as to interrupt said connections from said one of said tape boxes and complete said connections from another of said tape boxes to said electro-typesetter.

13. A control system for a line casting machine which comprises an electro-typesetter having a plurality of circuits for controlling the operation of said machine, a plurality of tape boxes each adapted to advance a perforated tape step by step therethrough and to analyze successive lines of perforations in the tape, electrical connections from each of said tape boxes to said electro-typesetter for controlling the operation thereof, means for separately interrupting the connections between each of said tape boxes and said line casting machine, a relay group connected with each tape box and arranged for repeated adjustment in accordance with the perforations in successive regions of the tape, electrical circuits interconnecting said tape boxes when the several relay groups coincide in their settings, said circuits including relays arranged to control said means to complete the electrical connections between one of said tape boxes and said electro-typesetter, circuits completed through said relay group connected with said one of said tape boxes in response to the sensing of certain perforations in the tape therein to so control said means as to interrupt said connections from said one of said tape boxes and complete said connections from another of said tape boxes to said electro-typesetter, and circuits completed through said relay group connected with said other of said tape boxes in response to the sensing of a certain signal represented by at least one perforation in the tape therein for controlling said means to interrupt the connection between said other tape box and the electro-typesetter.

14. A control system for a line casting machine which comprises an electro-typesetter having a plurality of circuits for controlling the operation of said machine, a plurality of tape boxes each adapted to advance a perforated tape step by step therethrough and to analyze successive lines of perforations in the tape, electrical connections from each of said tape boxes to said electro-typesetter for controlling the operation thereof, means for separately interrupting the connections between each of said tape boxes and said electro-typesetter, a relay group connected with each tape box and arranged for repeated adjustment in accordance with the perforations in successive regions of the tape, and electrical circuits interconnecting said tape boxes when the several relay groups coincide in their settings, said circuits including relays arranged to control said means to complete the connection between one of said tape boxes and said electro-typesetter only when another of said tape boxes senses a certain signal represented by a perforation line in the tape therein.

15. A control system for a line casting machine which comprises an electro-typesetter having a plurality of circuits for controlling the operation of said machine, a plurality of tape boxes each adapted to advance a perforated tape step-by-step therethrough and to analyze successive lines of perforations in the tape, electrical connections from each of said tape boxes to said electro-typesetter for controlling the operation thereof, means for separately interrupting the connections between each of said tape boxes and said electro-typesetter, a relay group connected with each tape box and arranged for repeated adjustment in accordance with the perforations in successive regions of the tape, electrical circuits interconnecting said tape boxes when the several relay groups coincide in their settings, said circuits including relays arranged to control said means to complete the connection between one of said tape boxes and said electro-typesetter only when another of said tape boxes senses a certain signal represented by a perforation line in the tape therein, and means responsive to another signal sensed by said other of said tape boxes for stepping the tape in said one of said boxes while the connections between the latter and said electro-typesetter are interrupted.

16. A control system for a line casting machine which comprises an electro-typesetter having a plurality of circuits for controlling the operation of said machine, a plurality of tape boxes each adapted to advance a tape step by step and to analyze successive lines of perforations in said tape, each tape being provided with lines of perforations identified with certain code designations and other lines of perforations identified with matter to be printed, means including electrical circuits for advancing the tapes simultaneously in analyzing the code designations, means including electrical circuits and a plurality of relays for comparing the code designations in the several tapes, means for disabling said tape advancing means whenever the code perforations being compared in the two tapes do not coincide, means including electrical circuits and relays energized upon completion of the comparison of a code designation for connecting one of said tape boxes with said electro-typesetter for control of the latter by the tape in said box and for control of the advance of said tape by said machine, and means including electrical circuits and relays responsive to a certain signal represented by a perforation line in said tape in said one box for disconnecting the latter from said electro-typesetter and connecting another of said tape boxes with said electro-typesetter for control of the same.

17. A control system for a line casting machine which comprises an electro-typesetter having a plurality of circuits for controlling the operation of said machine, a plurality of tape boxes each adapted to advance a tape step by step and to analyze successive lines of perforations in said tape, each tape being provided with lines of perforations identified with certain code designations and other lines of perforations identified with matter to be printed, means including electrical circuits for advancing the tapes simultaneously in analyzing the code designations, means including electrical circuits and a plurality of relays for comparing the code designations in the several tapes, means for disabling said tape advancing means whenever the code perforations being compared in the two tapes do not coincide, means including electrical circuits and relays energized upon completion of the comparison of a code designation for connecting one of said tape boxes with said electro-typesetter for control of the latter by the tape in said box and for control of the advance of said tape by said electro-typesetter, said last mentioned means being rendered effective only upon receipt thereby of a predetermined signal transmitted from another of said tape boxes in response to sensing of the last line of perforations of a code designation in the tape therein, and means including electrical circuits and relays responsive to a certain signal represented by a perforation line in said tape in said one box for disconnecting the latter from said electro-typesetter and connecting another of said tape boxes with said electro-typesetter for control of the same.

18. A control system for a line casting machine which comprises an electro-typesetter having a plurality of circuits for controlling the operation of said machine, a plurality of tape boxes each adapted to advance a tape step by step and to analyze successive lines of perforations in said tape, each tape being provided with lines of perforations identified with certain code designations and other lines of perforations identified with matter to be printed, means including electrical circuits for advancing the tapes simultaneously in analyzing the code designations, means including electrical circuits and a plurality of relays for comparing the code designations in the several tapes, means for disabling said tape advancing means whenever the code perforations being compared in the two tapes do not coincide, means including electrical circuits and relays energized upon completion of the comparison of a code designation for connecting one of said tape boxes with said electro-typesetter for control of the latter by the tape in said box and for control of the advance of said tape by said electro-typesetter, said last mentioned means being rendered effective only upon receipt thereby of a predetermined signal transmitted from another of said tape boxes in response to sensing of the last line of perforations of a code designation in the tape therein, means responsive to a different predetermined signal transmitted by said other tape box upon the sensing of the last line of perforations of a code designation group for controlling the further advance of the tape in said one of said tape boxes while the latter remains disconnected from said electro-typesetter, and means including electrical circuits and relays effective after the transmission of said first mentioned predetermined signal and responsive to a certain signal represented by a perforation line in said tape in said one box for disconnecting the latter from said electro-typesetter and connecting another of said tape boxes with said electro-typesetter for control of the same.

19. A control system for a line casting machine which comprises a plurality of tape boxes each adapted to advance a tape step by step and to analyze successive lines of perforations in said tape, each tape being provided with lines of perforations identified with certain code designations and other lines of perforations identified with matter to be printed, means including electrical circuits for advancing the tapes simultaneously in analyzing the code designations, means including electrical circuits and a plurality of relays for comparing the code designations in the several tapes, means associated with said code comparing means for disabling said tape advancing means when the code designations in the several tapes do not coincide, means including electrical circuits and relays energized upon completion of the comparison of a code designation for connecting one of said tape boxes with said line casting machine for control of the latter by the tape in said box and for control of the advance of said tape by said machine, and means including electrical circuits and relays responsive to a certain signal represented by a perforation line in said tape in said one box for disconnecting the latter from said machine and connecting another of said tape boxes with said machine for control of the same.

20. In a control system for a line casting machine, a control unit having a plurality of rotary shafts, means for constantly rotating one of said shafts at a predetermined speed, means for rotating another of said shafts at a predetermined slower speed, releasable means for preventing rotation of said other of said shafts and enabling a single revolution of said other shaft upon release of said means, a tape box, tape advancing means comprising an electromagnet in said box adapted to advance a perforated tape step by step, and means on said shafts selectively operable to energize said electromagnet repeatedly to effect step by step operation of said tape advancing means, said means on said other of said shafts being arranged to bring about a plurality of operations of said tape advancing means during a single revolution of the shaft.

21. A control system for a line casting machine which comprises a plurality of tape boxes each adapted to advance a tape step by step and to analyze successive lines of perforations in said tape, each tape being provided with lines of perforations identified with certain code designations and other lines of perforations identified with matter to be printed, means including electrical circuits for advancing said tapes step by step, a control unit for controlling the operation of said means, said unit comprising a plurality of rotary shafts, means for constantly rotating one of said shafts at a predetermined speed, means for rotating another of said shafts at a predetermined slower speed, releasable means for preventing rotation of said other of said shafts and upon release enabling a single revolution of said other shaft, means on one of said shafts for completing circuits to effect operation of said tape advancing means for all of said tapes, and means on another of said shafts for completing a circuit to effect operation of said tape advancing means for only one of said tapes.

22. A control system for a line casting machine which comprises a plurality of tape boxes each adapted to advance a tape step by step and to analyze successive lines of perforations in said tape, each tape being provided with lines of perforations identified with certain code designations and other lines of perforations identified with matter to be printed, means including electrical circuits for advancing said tapes step by step, a control unit for controlling the operation of said means, said unit comprising a plurality of rotary shafts, means for constantly rotating one of said shafts at a predetermined speed, means for rotating another of said shafts at a predetermined slower speed, releasable means for preventing rotation of said other of said shafts and upon release enabling a single revolution of said other shaft, means on one of said shafts for completing circuits to effect operation of said tape advancing means for all of said tapes, and means on another of said shafts for completing a circuit to effect operation of said tape advancing means for only one of said tapes, said means on said other of said shafts being rendered effective only when said perforations in one of said tapes identified with a code designation predetermines a particular signal.

23. A control system for a line casting machine which comprises an electro-typesetter having a plurality of circuits for controlling the operation of said machine, a plurality of tape boxes each adapted to advance a perforated tape step by step therethrough and having feeler elements therein adapted to analyze successive lines of perforation in the tape, said tapes having successive groups of lines of perforations identified with predetermined code designations and intermediate said successive groups a plurality of lines of perforations identified with matter to be cast, said last mentioned lines of perforations on the several tapes following each code designation being identified with correlated matter to be cast, electrical connections including a control unit and relays interconnecting said tape boxes and arranged to compare the code designations in the tapes therein, means for disabling said tape advancing means whenever the code perforations being compared in the two tapes do not coincide, multi-wire electrical connections between each of said tape boxes and said electro-typesetter for control of the latter by said tapes, means in said multi-wire connections normally rendering the same ineffective, connections from said control unit to the tape advancing means in the several tape boxes to control the advance of the tapes therein as the code designations are being compared, means controlled by the code perforations in one of said tapes for determining whether related matter represented by perforations in said tapes is to be accepted and cast, and means responsive to said last mentioned means for rendering said multi-wire connections successively effective for the control of said line casting machine by said tapes successively.

24. A control system for a line casting machine which comprises an electro-typesetter having a plurality of circuits for controlling the operation of said machine, a plurality of tape boxes each adapted to advance a perforated tape step by step therethrough and having feeler elements therein adapted to analyze successive lines of perforation in the tape, said tapes having successive groups of lines of perforations identified with predetermined code designations and intermediate said successive groups a plurality of lines of perforations identified with matter to be cast, said last mentioned lines of perforations on the several tapes following each code designation being identified with correlated matter to be cast, electrical connections including a control unit and relays interconnecting said tape boxes and arranged to compare the code designations in the tapes therein, means for disabling said tape advancing means whenever the code perforations being compared in the two tapes do not coincide, multi-wire electrical connections between each of said tape boxes and said electro-typesetter for control of the latter by said tapes, means in said multi-wire connections normally rendering the same ineffective, connections from said control unit to the tape advancing means in the several tape boxes to control the advance of the tapes therein as the code designations are being compared, means controlled by the code perforations in one of said tapes for determining whether related matter represented by perforations in said tapes is to be accepted and cast or rejected and not cast, means responsive to said code perforation controlled means when the matter is to be accepted and cast for rendering said multi-wire connections from one of said tape boxes to said electro-typesetter effective for control of the line casting machine and the stepping of the tape in said box under control of said electro-typesetter, and means controlled by the tape in said box for rendering the multi-wire connections therefrom ineffective and rendering the multi-wire connections from another of said tape boxes to said electro-typesetter effective.

25. A control system for a line casting machine which comprises an electro-typesetter having a plurality of circuits for controlling the operation of said machine, a plurality of tape boxes each adapted to advance a perforated tape step by step therethrough and having feeler elements therein adapted to analyze successive lines of perforation in the tape, said tapes having successive groups of lines of perforations identified with predetermined code designations and intermediate said successive groups a plurality of lines of perforations identified with matter to be cast, said last mentioned lines of perforations on the several tapes following each code designation being identified with correlated matter to be cast, electrical connections including a control unit and relays interconnecting said tape boxes and arranged to compare the code designations in the tapes therein, means for disabling said tape advancing means whenever the code perforations being compared in the two tapes do not coincide, multi-wire electrical connections between each of said tape boxes and said electro-typesetter for control of the latter by said tapes, means in said multi-wire connections normally rendering the same ineffective, connections from said control unit to the tape advancing means in the several tape boxes to control the advance of the tapes therein as the code designations are being compared, means controlled by the code perforations in one of said tapes for determining whether related matter represented by perforations in said tapes is to be accepted and cast or rejected and not cast, means responsive to said code perforation controlled means when the matter is to be rejected for causing rapid stepping by said control unit of the tape in one of said tape boxes, means responsive to said code perforation controlled means when the matter is to be accepted and cast for rendering said multi-wire connections from one of said tape boxes to said electro-typesetter effective for control of the line casting machine and the stepping of the tape in said box under control of said machine, and means controlled by the tape in said box for rendering the multi-wire connections therefrom ineffective and rendering the multi-wire connections from another of said tape boxes to said electro-typesetter effective.

26. A control system for a line casting machine which comprises an electro-typesetter having a plurality of circuits for controlling the operation of said machine, a plurality of tape boxes each adapted to advance a perforated tape step by step therethrough and having feeler elements therein adapted to analyze successive lines of perforation in the tape, said tapes having successive groups of lines of perforations identified with predetermined code designations and intermediate said successive groups a plurality of lines of perforations identified with matter to be cast, said last mentioned lines of perforations on the several tapes following each code designation being identified with correlated matter to be cast, electrical connections including a control unit and relays interconnecting said tape boxes and arranged to compare the code designations in the tapes therein, means for disabling said tape advancing means whenever the code perforations being compared in the two tapes do not coincide, multi-wire electrical connections between each of said tape boxes and said electro-typesetter for control of the latter by said tapes, means in said multi-wire connections normally rendering the same ineffective, connections from said control unit to the tape advancing means in the several tape boxes to control the advance of the tapes therein as the code designations are being compared, means controlled by the code perforations in one of said tapes for determining whether related matter represented by perforations in said tapes is to be accepted and cast or rejected and not cast, means responsive to said code perforation controlled means when the matter is to be rejected for causing rapid stepping by said control unit of the tape in one of said tape boxes, means responsive to said code perforation controlled means when the matter is to be accepted and cast for rendering said multi-wire connections from one of said tape boxes to said electro-typesetter effective for control of the line casting machine and the stepping of the tape in said box under control of said electro-typesetter, means controlled by the tape in said box for rendering the multi-wire connections therefrom ineffective and rendering the multi-wire connections from another of said tape boxes to said electro-typesetter effective, and means controlled by the tape in said other of said tape boxes for rendering said multi-wire connection therefrom to said electro-typesetter ineffective and restoring control of the tape advancing means of the several tape boxes to said control unit.

27. A method of controlling a line casting machine which comprises punching a plurality of tapes in accordance with a predetermined code system to provide in each tape control perforations corresponding with only a portion of the matter to be cast in each of a plurality of lines, one of said tapes being punched in advance of another and being provided with perforations corresponding with standing information available at a relatively early time while said other tape is punched to provide perforations corresponding with variable information available only at a later time, and controlling the operation of the line casting machine first by the perforations in one tape and then in another in cyclic succession to set up and cast successive lines of matter to be printed.

28. A method of controlling a line casting machine which comprises punching a plurality of tapes in accordance with a predetermined code system to provide in each tape control perforations corresponding with only a portion of the matter to be cast in each of a plurality of lines, one of said tapes being punched in advance of another and being provided with perforations corresponding with standing information available at a relatively early time while said other tape is punched to provide perforations corresponding with variable information available only at a later time, providing said tape having the variable information with perforations indicating whether certain information on the several tapes shall be accepted or rejected, and controlling the operation of the line casting machine first by the perforations in one tape and then in another in cyclic succession to set up and cast successive lines of only such matter as has been accepted and is to be printed.

29. A method of controlling a line casting machine which comprises punching a plurality of tapes in accordance with a predetermined code system to provide in each tape control perforations corresponding with only a portion of the matter to be cast in each of a plurality of lines, punching each of said tapes to provide perforations affording a code designation in advance of each group of perforations identified with an item of matter to be cast, comparing the related code designation perforations in the several tapes, and controlling the operation of the line casting machine first by the perforations identified with matter to be cast in one tape and then in another in cyclic succession to set up and cast successive lines of matter to be printed only so long as said code designations in the several tapes coincide.

30. A method of controlling a line casting machine which comprises punching a plurality of tapes in accordance with a predetermined code system to provide in each tape groups of control perforations corresponding with successive items to be cast, the successive items represented by the perforations in one tape being correlated with those in another, punching each of said tapes to provide perforations affording a code designation in advance of each group of perforations identified with an item to be cast, comparing the related code designation perforations in the several tapes, and controlling the operation of the line casting machine by perforations in one tape and then in another in cyclic succession to set up and cast the successive correlated items of matter to be printed only so long as said code designation perforations in the several tapes coincide.

References Cited in the file of this patent

UNITED STATES PATENTS

| | | |
|---|---|---|
| 1,606,126 | Houston | Nov. 9, 1926 |
| 2,134,118 | Foss | Oct. 25, 1938 |
| 2,137,603 | Clokey et al. | Nov. 22, 1938 |
| 2,198,321 | Sylvester | Apr. 23, 1940 |
| 2,199,541 | Harrison et al. | May 7, 1940 |
| 2,240,562 | Lake et al. | May 6, 1941 |
| 2,646,155 | Cardon | July 21, 1953 |